United States Patent
Ahn et al.

(10) Patent No.: US 9,055,564 B2
(45) Date of Patent: Jun. 9, 2015

(54) APPARATUS AND METHOD FOR TRANSMITTING INFORMATION ON POWER HEADROOM IN MULTIPLE COMPONENT CARRIER SYSTEM

(75) Inventors: Jae Hyun Ahn, Seoul (KR); Myung Cheul Jung, Seoul (KR); Ki Bum Kwon, Seoul (KR); Sung Jin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 153 days.

(21) Appl. No.: 13/817,659

(22) PCT Filed: Aug. 18, 2011

(86) PCT No.: PCT/KR2011/006071
§ 371 (c)(1),
(2), (4) Date: Feb. 19, 2013

(87) PCT Pub. No.: WO2012/023812
PCT Pub. Date: Feb. 23, 2012

(65) Prior Publication Data
US 2013/0148619 A1 Jun. 13, 2013

(30) Foreign Application Priority Data
Aug. 20, 2010 (KR) .................. 10-2010-0081055
Oct. 6, 2010 (KR) .................. 10-2010-0097508

(51) Int. Cl.
*H04W 72/04* (2009.01)
*H04W 52/36* (2009.01)
*H04W 52/34* (2009.01)

(52) U.S. Cl.
CPC ............ *H04W 72/04* (2013.01); *H04W 52/365* (2013.01); *H04W 72/0473* (2013.01); *H04W 52/34* (2013.01)

(58) Field of Classification Search
None
See application file for complete search history.

(56) References Cited

U.S. PATENT DOCUMENTS

2007/0270175 A1* 11/2007 Malladi et al. ................ 455/522
2008/0161033 A1*  7/2008 Borran et al. ................. 455/522
2010/0272091 A1* 10/2010 Fabien et al. ................. 370/345

(Continued)

OTHER PUBLICATIONS

3GPP TS 36.321 V9.3.0—"3rd Generation Partnership Project; Technical Specification Group Radio Access Network; Evolved Universal Terrestrial Radio Access (E-UTRA); Medium Access Control (MAC) protocol specification" (Release 9) (Jun. 2010).*

(Continued)

*Primary Examiner* — Ayaz Sheikh
*Assistant Examiner* — Faiyazkhan Ghafoerkhan
(74) *Attorney, Agent, or Firm* — H.C. Park & Associates, PLC

(57) ABSTRACT

There are provided an apparatus and method for transmitting power headroom information in a multiple component carrier system. The method includes finding Combination Power Headroom (CPH), that is a power headroom, calculated in an User Equipment (UE)-specific way with consideration taken of uplink transmission through a plurality of component carriers configured in the UE, generating CPH information used to inform an evolved NodeB (eNodeB:eNB) of the CPH, and sending the CPH information to the eNB. According to the present invention, power headroom for a combination component carrier is provided to an eNB in a wireless communication system in which a carrier aggregation is used. Accordingly, reliable dynamic carrier aggregation scheduling can be induced, and thus uplink transmission performance can be improved.

18 Claims, 14 Drawing Sheets

(56) References Cited

U.S. PATENT DOCUMENTS

2011/0014940 A1* 1/2011 Zhang et al. ............... 455/522
2011/0038271 A1* 2/2011 Shin et al. .................. 370/252
2011/0080838 A1* 4/2011 Larsson et al. ............. 370/252
2012/0196645 A1* 8/2012 Kim et al. .................. 455/524

OTHER PUBLICATIONS

International Search Report of PCT/KR2011/006071 mailed on Mar. 28, 2012.

MEDIATEK. "Per UE PHR for carrier aggregation", 3GPP TSG-RAN WG1 Meeting #61bis. R1-103743, Jun. 28-Jul. 2, 2010. (Retrieved from the Internet on Mar. 27, 2012: <URL:http://www.3gpp.org/ftp/tsg_ran/wg1_r11/tsgr1_61b/docs>).

3GPP. "3rd Generation Partnership Project: Technical Specification Group Radio Access Network: Evolved Universal Terrestrial Radio Access (E-UTRA): Medium Access Control (MAC) protocol specification (Release 9)", 3GPP TS 36.321 V9.3.0. Jun. 2010. (Retrieved from the Internet on Mar. 27, 2012: < URL: http://www.3gpp.org/ftp/Specs/html-info/36321.htm >).

HTC. "Power Headroom Reporting." 3GPP TSG-RAN WG1 #61. R1-102732. May 10-14, 2010 (Retrieved from the Internet on Mar. 27, 2012: < URL: http://www.3gpp.org/ftp/tsg_ran/WG1_RL1/TSGR1_61/Docs >).

* cited by examiner

| CCCIF(Type 1) | Indication | Combination CC | CPHF |
|---|---|---|---|
| 1 1 0 0 0 | ⟹ | {CC1, CC2} | ⟹ $CPH_1$ |
| 1 0 1 0 0 | ⟹ | {CC1, CC3} | ⟹ $CPH_2$ |
| 0 1 1 0 0 | ⟹ | {CC2, CC3} | ⟹ $CPH_3$ |
| 1 1 1 0 0 | ⟹ | {CC1, CC2, CC3} | ⟹ $CPH_4$ |

Fig. 9

CCCIF(Type 2)    Indication    Combination CC              CPHF

| 1 | 1 | 1 | 0 | 0 |  ⟹  {CC1, CC2}, {CC2, CC3}        ⟹  $CPH_1$, $CPH_2$,
                       {CC1, CC3}, {CC1, CC2, CC3}           $CPH_3$, $CPH_4$

APPARATUS AND METHOD FOR TRANSMITTING INFORMATION ON POWER HEADROOM IN MULTIPLE COMPONENT CARRIER SYSTEM

CROSS-REFERENCE TO RELATED APPLICATIONS

This application is the National Stage Entry of International Application No. PCT/KR2011/006071, filed on Aug. 18, 2011, and claims priority from and the benefit of Korean Patent Application No. 10-2010-0081055, filed on Aug. 20, 2010 and Korean Patent Application No. 10-2010-0097508, filed on Oct. 6, 2010, all of which are hereby incorporated by reference for all purposes in their entirety as if fully set forth herein

BACKGROUND

1. Field

The present invention relates to wireless communication, and more particularly, to an apparatus and method for transmitting information about power headroom in a multiple component carrier system.

2. Discussion of the Background

A wireless communication system uses one bandwidth for data transmission. For example, the $2^{nd}$ generation wireless communication system uses a bandwidth of 200 KHz to 1.25 MHz, and the $3^{rd}$ generation wireless communication system uses a bandwidth of 5 MHz to 10 MHz. In order to support an increasing transmission capacity, the bandwidth of a recent 3GPP LTE or 802.16m has extended to 20 MHz or higher. To increase the bandwidth may be considered to be indispensable so as to increase the transmission capacity, but to support a high bandwidth even when the quality of service required is low may generate great power consumption.

In order to solve the problem, there has emerged a multiple component carrier system in which a component carrier having one bandwidth and the center frequency is defined and data is transmitted or received through a plurality of component carriers using a wide band. That is, a narrow band and a wide band are supported at the same time by using one or more component carriers. For example, if one component carrier corresponds to a bandwidth of 5 MHz, a maximum 20 MHz bandwidth can be supported by using four component carriers.

A method of an eNodeB efficiently using the resources of a user equipment is to use power headroom information provided by the user equipment. The power headroom information is essential information for efficiently allocating uplink resources in wireless communication and reducing the battery consumption of a user equipment. When the user equipment provides the power headroom information to the eNodeB, the eNodeB can estimate maximum transmission power in uplink that the user equipment can withstand. Accordingly, the eNodeB can perform uplink scheduling within a range in which the estimated maximum transmission power in uplink is not exceed.

Power headroom for each component carrier has a relatively small variance. Meanwhile, when a plurality of component carriers is dynamically scheduled, the variance may become relatively high. For this reason, the power headrooms of component carriers must be taken into account individually or overall. In this case, there are problems in that to control the power of a user equipment becomes more complicated and the amount of control information occupied by a Power Headroom Report (PHR) is increased. However, a method of reporting power headroom with consideration taken of a plurality of dynamically scheduled component carriers or the structure of a message for a PHR has not yet been defined.

SUMMARY

An object of the present invention is to provide an apparatus and method for transmitting Combination Power Headroom (CPH) information in a multiple component carrier system.

Another object of the present invention is to provide an apparatus and method for receiving CPH information in a multiple component carrier system.

Yet another object of the present invention is to provide an apparatus and method for configuring CPH information in a multiple component carrier system.

Further yet another object of the present invention is to provide a method of performing scheduling using CPH information in a multiple component carrier system.

Further yet another object of the present invention is to provide an apparatus and method for indicating the transmission of CPH information in a multiple component carrier system.

Further yet another object of the present invention is to provide an apparatus and method in which a user equipment transmits power information about one or more component carriers in a multiple component carrier system.

Further yet another object of the present invention is to provide a scheduler apparatus for a user equipment supporting one or more component carriers in a multiple component carrier system and a method using the same.

According to an aspect of the present invention, there is provided a method of a User equipment (UE) transmitting power headroom information in a multiple component carrier system. The method includes finding Combination Power Headroom (CPH) which is power headroom calculated in an UE-specific way with consideration taken of uplink transmission through a plurality of component carriers configured in the UE, generating CPH information used to inform a eNodeB (eNB) of the CPH, and sending the CPH information to the eNB.

The CPH information comprises a combination indication field indicative of a combination, composed of the plurality of component carriers, and a Combination Power Headroom Field (CPHF) indicative of the CPH.

According to another aspect of the present invention, there is provided a method of an eNB receiving power headroom information in a multiple component carrier system. The method includes receiving, from an UE, Combination Power Headroom (CPH) information which is power headroom calculated in an UE-specific way with consideration taken of uplink transmission through a plurality of component carriers configured in the UE, performing dynamic uplink scheduling for the UE based on the CPH information, and sending an uplink grant, including an uplink transmission parameter determined by the dynamic uplink scheduling, to the UE.

The plurality of component carriers forms a combination, and the CPH information comprises a combination indication field indicative of the combination and a Combination Power Headroom Field (CPHF) indicative of a value of the CPH.

According to yet another aspect of the present invention, there is provided an apparatus for transmitting power headroom information in a multiple component carrier system. The apparatus includes a combination generation unit for configuring a plurality of component carriers, configured in an UE, as one combination, a CPH calculation unit for finding CPH which is power headroom calculated in an UE-specific way with consideration taken of uplink transmission through the combination, a CPH information generation unit for generating CPH information used to inform an eNB of the CPH, and a CPH information transmission unit for sending the CPH information to the eNB.

The CPH information generation unit generates the CPH information, comprising a combination indication field indicative of the combination and a CPHF indicative of a value of the CPH.

According to further yet another aspect of the present invention, there is provide an apparatus for receiving power headroom information in a multiple component carrier system. The apparatus includes a CPH information reception unit for receiving CPH information calculated in an UE-specific way with consideration taken of uplink transmission through a plurality of component carriers configured in the UE, an uplink scheduler for performing dynamic uplink scheduling within a range that an uplink maximum transmission power of the UE is not exceed based on the CPH information and generating an uplink grant, and an uplink grant transmission unit for sending the uplink grant to the UE.

The plurality of component carrier configures a combination, and the CPH information comprises a combination indication field indicative of the combination and a CPHF indicative of a value of the CPH.

In accordance with the present invention, power headroom for a combination component carrier is provided to a eNodeB in a wireless communication system using a carrier aggregation. Accordingly, reliable dynamic carrier aggregation scheduling can be induced, and uplink transmission performance can be improved.

BRIEF DESCRIPTION OF THE DRAWINGS

FIG. 9 is a diagram showing an example of a CCCIF of Type 2 according to the present invention;

DETAILED DESCRIPTION OF THE ILLUSTRATED EMBODIMENTS

Figure 1:
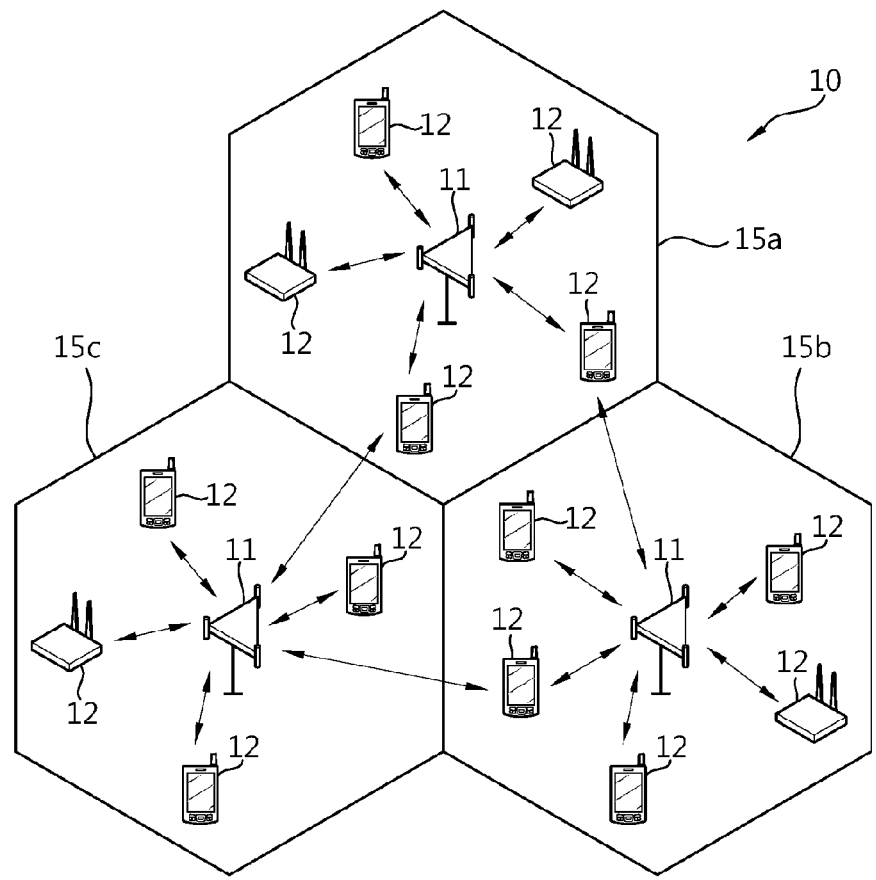
FIG. 1 is shows a wireless communication system.

Hereinafter, in this specification, some embodiments of the present invention will be described in detail with reference to some exemplary drawings. It is to be noted that in assigning reference numerals to respective elements in the drawings, the same reference numerals designate the same elements although the elements are shown in different drawings. Furthermore, in describing the present invention, a detailed description of the known functions and constructions will be omitted if it is deemed to make the gist of the present invention unnecessarily vague.

Furthermore, in describing the elements of this specification, terms, such as the first, second, A, B, a, and b, may be used. However, the terms are used to only distinguish one element from the other element, but the essence, order, and sequence of the elements are not limited by the terms. Furthermore, in the case in which one element is described to be "connected", "coupled", or "jointed" to the other element, the one element may be directly connected or coupled to the other element, but it should be understood that a third element may be "connected", "coupled", or "jointed" between the two elements.

Furthermore, in this specification, a wireless communication network is chiefly described. Tasks performed in the wireless communication network may be performed in a process of a system (for example, a eNodeB), managing the wireless communication network, control the network and transmitting data or may be performed by a user equipment coupled to the network.

FIG. 1 is shows a wireless communication system.

Referring to FIG. 1, the wireless communication systems 10 are widely deployed in order to provide a variety of communication services, such as voice and packet data. The wireless communication system 10 includes one or more eNodeBs (eNB) 11. Each eNB 11 provides communication services to specific geographical areas (typically called cells 15*a*, 15*b*, and 15*c*. The cell may be classified into a plurality of areas (called a sector).

A User equipments (UE) 12 may be fixed or mobile and may also be called another terminology, such as Mobile Station (MS), an MT (Mobile Terminal), a User Terminal (UT), an Subscriber Station (SS), a wireless device, a Personal Digital Assistant (PDA), a wireless modem, or a handheld device.

The evolved NodeB (eNodeB: eNB) 11 refers to a fixed station communicating with the UE 12, and it may also be called another terminology, such as Base Station (BS), a Base Transceiver System (BTS), or an access point. The cell should be interpreted as a comprehensive meaning indicating some areas covered by the eNB 11, and it has a meaning to comprehensively cover various coverage areas, such as a mega cell, a macro cell, a micro cell, a pico cell, and a femto cell.

Hereinafter, DL (downlink) refers to communication from the eNB 11 to the UE 12, and uplink (UL) refers to communication from the UE 12 to the eNB 11. In downlink, a transmitter may be a part of the eNB 11, and a receiver may be a part of the UE 12.

In uplink, a transmitter may be a part of the UE 12, and a receiver may be a part of the eNB 11.

There are no limits to multiple access schemes applied to the wireless communication system. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, may be used.

The layers of a radio interface protocol between an UE and a network may be classified into a first layer L1, a second layer L2, and a third layer L3 on the basis of three lower layers of an Open System Interconnection (OSI) which has been widely known in the communication systems.

A physical layer (i.e., the first layer) is connected to a higher Medium Access Control (MAC) layer through a transport channel. Data between the MAC layer and the physical layer is moved through the transport channel. Furthermore, data between different physical layer (i.e., the physical layers on the transmission side and on the reception side) is moved through a physical channel. There are some control channels used in the physical layer.

A Physical Downlink Control Channel (PDCCH) through which physical control information is transmitted informs a UE of the resource allocation of a paging channel (PCH) and a downlink shared channel (DL-SCH) and Hybrid Automatic Repeat Request (HARQ) information related to the DL-SCH. The PDCCH may carry an uplink grant, informing a UE of the allocation of resources for uplink transmission. A Physical Control Format Indicator Channel (PCFICH) is used to inform a UE of the number of OFDM symbols used in the PDCCHs and is transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information, such as a Channel Quality Indicator (CQI). A Physical Uplink Shared Channel (PUSCH) carries a uplink shared channel (UL-SCH).

A situation in which an UE sends a PUCCH or a PUSCH is as follows.

An UE configures a PUCCH for one or more pieces of Channel Quality Information (CQI) and pieces of information about a Precoding Matrix Index (PMI) selected based on measured space channel information, and information about a Rank Indicator (RI) and periodically sends the configure PUCCH to an eNB. Furthermore, the UE receives downlink data from the eNB and must send Acknowledgement/non-Acknowledgement (ACK/NACK) information about the downlink data to the eNB after a certain number of subframes. For example, if downlink data is received in an $n^{th}$ subframe, the UE sends a PUCCH, composed of ACK/NACK information about the downlink data, in an $(n+1)^{th}$ subframe. If ACK/NACK information cannot be all transmitted on a PUCCH allocated by the eNB or if a PUCCH on which ACK/NACK information can be transmitted is not allocated by the eNB, the UE may carry the ACK/NACK information on a PUSCH.

A radio data link layer (i.e., the second layer) includes an MAC layer, an RLC layer, and a PDCP layer. The MAC layer is a layer responsible for mapping between a logical channel and a transport channel. The MAC layer selects a proper transport channel suitable for sending data received from the RLC layer and adds necessary control information to the header of an MAC Protocol Data Unit (PDU). The RLC layer is placed over the MAC layer and configured to support reliable data transmission. Furthermore, the RLC layer segments and concatenates RLC Service Data Units (SDUs) received from a higher layer in order to configure data having a size suitable for a radio section. The RLC layer of a receiver supports a data reassembly function for recovering original RLC SDUs from received RLC PDUs. The PDCP layer is used only in a packet exchange region, and it can compress and send the header of an IP packet in order to increase the transmission efficiency of packet data in a radio channel.

An RRC layer (i.e., the third layer) functions to control a lower layer and also to exchange pieces of radio resource control information between an UE and a network. A variety of RRC states, such as an idle mode and an RRC connected mode, are defined according to the communication state of an UE. An UE may transfer between the RRC states, if necessary. Various procedures related to the management of radio resources, such as system information broadcasting, an RRC access management procedure, a multiple component carrier configuration procedure, a radio bearer control procedure, a security procedure, a measurement procedure, and a mobility management procedure (handover), are defined in the RRC layer.

A carrier aggregation (CA) supports a plurality of carriers. The carrier aggregation is also called a spectrum aggregation or a bandwidth aggregation. Individual unit carriers aggregated by a carrier aggregation are called a Component Carrier (CC). Each CC is defined by the bandwidth and the center frequency. The carrier aggregation is introduced in order to support an increased throughput, prevent an increase of the expenses due to the introduction of a Radio Frequency (RF) device, and guarantee compatibility with the existing system. For example, if five CCs are allocated as the granularity of a carrier unit having a 5 MHz bandwidth, the bandwidth of a maximum of 20 MHz can be supported.

CCs may be divided into a primary CC (hereinafter referred to as a PCC) and a secondary CC (hereinafter referred to as an SCC) according to whether they have been activated. The PCC is a carrier that is always activated, and the SCC is a carrier that is activated or deactivated according to a specific condition. Activation means that the transmission or reception of traffic data is being performed or in a standby state. Deactivation means that the transmission or reception of traffic data is impossible, but measurement or the transmission/reception of minimum information is possible. An UE may use only one PCC and one or more SCCs along with a PCC. An eNB may allocate the PCC or the SCC or both to an UE.

Figure 2:
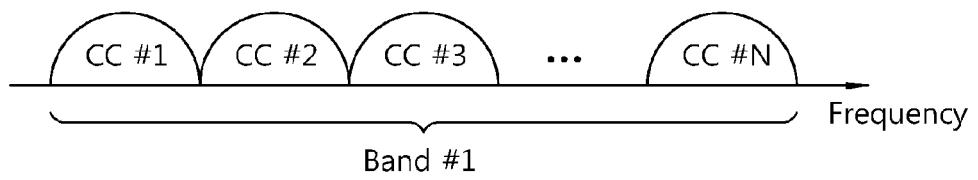
FIG. 2 is an explanatory diagram illustrating an intra-band contiguous carrier aggregation.
Figure 3:
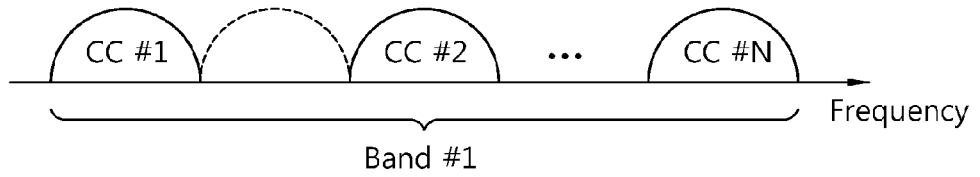
FIG. 3 is an explanatory diagram illustrating an intra-band non-contiguous carrier aggregation.
Figure 4:
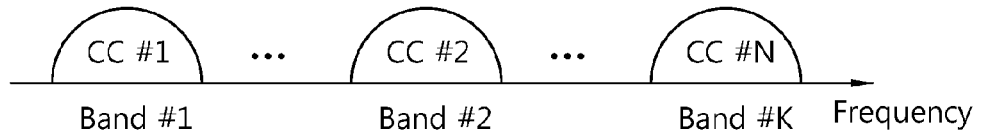
FIG. 4 is an explanatory diagram illustrating an inter-band carrier aggregation.

The carrier aggregation may be classified into an intra-band contiguous carrier aggregation, such as that shown in FIG. 2, an intra-band non-contiguous carrier aggregation, such as that shown in FIG. 3, and an inter-band carrier aggregation, such as that shown in FIG. 4.

Referring to FIG. 2, the intra-band contiguous carrier aggregation is formed within intra-band continuous CCs. For example, aggregated CCs, that is, a CC#1, a CC#2, a CC#3 to a CC #N are contiguous to each other.

Referring to FIG. 3, the intra-band non-contiguous carrier aggregation is formed between discontinuous CCs. For example, aggregated CCs, that is, a CC#1 and a CC#2 are spaced apart from each other by a specific frequency.

Referring to FIG. 4, the inter-band carrier aggregation is of a type in which, when a plurality of CCs exists, one or more of the CCs are aggregated on different frequency bands. For example, an aggregated CC, that is, CC #1 exists in a band #1, and an aggregated CC, that is, a CC #2 exists in a band #2.

The number of carriers aggregated between downlink and uplink may be different. The case where the number of DL CCs is identical with the number of UL CCs is called a symmetric aggregation, and a case where the number of DL CCs is different from the number of UL CCs is called an asymmetric aggregation.

Furthermore, CCs may have different sizes (i.e., bandwidths). For example, assuming that 5 CCs are used to configure a 70 MHz band, the configuration may have a form, such as 5 MHz CC (carrier #0)+20 MHz CC (carrier #1)+20 MHz CC (carrier #2)+20 MHz CC (carrier #3)+5 MHz CC (carrier #4).

A multiple carrier system hereinafter refers to a system supporting the carrier aggregation. In the multiple carrier system, the contiguous carrier aggregation or the non-contiguous carrier aggregation or both may be used. Furthermore, either the symmetric aggregation or the asymmetric aggregation may be used.

Figure 5:
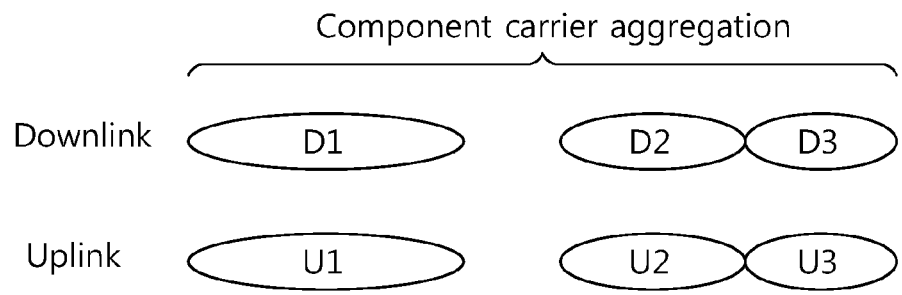
FIG. 5 shows a linkage between a downlink component carrier (DL CC) and an uplink component carrier (UL CC) in a multiple carrier system.

FIG. 5 shows a linkage between a downlink component carrier (DL CC) and a uplink component carrier (UL CC) in a multiple carrier system.

Referring to FIG. 5, in downlink, Downlink Component Carriers (hereinafter referred to as 'DL CC') $D_1$, $D_2$, and $D_3$ are aggregated. In uplink, Uplink Component Carriers (hereinafter referred to as 'UL CC') U1, U2, and U3 are aggregated. Here, Di is the index of a DL CC, and Ui is the index of a UL CC (where i=1, 2, 3). At least one DL CC is a PCC, and the remaining CCs are SCCs. Likewise, at least one UL CC is a PCC, and the remaining CCs are SCC. For example, D1 and U1 may be PCCs, and D2, U2, D3, and U3 may be SCCs.

In an FDD system, a DL CC and a UL CC are linked to each other in a one-to-one manner. D1 and U1, D2 and U2, and D3 and U3 are linked to each other in a one-to-one manner. An UE sets up linkages between the DL CCs and the UL CCs based on system information transmitted on a logical channel BCCH or an UE-dedicated RRC message transmitted on a DCCH. Each linkage may be set up in a cell-specific way or an UE-specific way.

Only the 1:1 linkage between the DL CC and the UL CC has been illustrated in FIG. 5, but a 1:n or n:1 linkage may also be set up. Furthermore, the index of a component carrier does not comply with the sequence of the component carrier or the position of the frequency band of the component carrier.

Hereinafter, power headroom (PH) is described.

Power headroom means surplus power that may be additionally used other than power which is now being used by an UE for uplink transmission. For example, it is assumed that an UE has maximum transmission power of 10 W (i.e., uplink transmission power of an allowable range). It is also assumed that the UE is now using power of 9 W in the frequency band of 10 MHz. In this case, power headroom is 1 W because the UE can additionally use power of 1 W.

Here, if an eNB allocates a frequency band of 20 MHz to the UE, power of 9 W×2=18 W is required. If the frequency band of 20 MHz is allocated to the UE, however, the UE cannot use the entire frequency band because the UE has the maximum power of 10 W, or the eNB may not properly receive signals from the UE owing to the shortage of power. In order to solve this problem, the UE reports the power headroom of 1 W to the eNB so that the eNB can perform scheduling within a range of the power headroom. This report is called a Power Headroom Report (PHR).

The reported power headroom may be given as in the following table.

TABLE 1

| Reported value | Measured quantity value (dB) |
| --- | --- |
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Referring to Table 1, power headroom belongs to a range of −23 dB to +40 dB. If 6 bits are used to represent the power headroom, $2^6(=64)$ kinds of indices can be represented. The power headroom is classified into a total of 64 levels. For example, if a bit to represent the power headroom is 0 (i.e., 000000 when being represented by 6 bits), the power headroom indicates '$-23 \leq P_{PH} \leq -22$ dB'.

A periodic PHR method may be used because the power headroom is frequently changed. According to the periodic PHR method, when a periodic timer expires, an UE triggers a PHR. After reporting power headroom, the UE drives the periodic timer again.

Furthermore, when a Path Loss (PL) estimate measured by an UE exceeds a certain reference value, the PHR may be triggered. The PL estimate is measured by an UE on the basis of Reference Symbol Received Power (RSRP).

Power headroom $P_{PH}$ is defined as a difference between a maximum transmission power $P_{max}$, configured in an UE, and a power $P_{estimated}$ estimated in regard to uplink transmission as in Equation 1 and is represented by dB.

$$P_{PH} = P_{max} - P_{estimated} \text{ [dB]} \qquad \text{[Math Figure 1]}$$

The power headroom $P_{PH}$ may also be called the remaining power or surplus power. That is, the remainder in which the estimated power $P_{estimated}$ (i.e., the sum of transmission power being used in each component carrier) has been subtracted from the maximum transmission power of an UE configured by an eNB becomes the power headroom $P_{PH}$.

For example, the estimated power $P_{estimated}$ is equal to power $P_{PUSCH}$ estimated in regard to the transmission of a Physical Uplink Shared Channel (hereinafter referred to as a PUSCH). In this case, the power headroom $P_{PH}$ can be obtained using Equation 2.

$$P_{PH} = P_{max} - P_{PUSCH} \text{ [dB]} \qquad \text{[Math Figure 2]}$$

For another example, the estimated power $P_{estimated}$ is equal to the sum of power $P_{PUSCH}$ estimated in regard to the transmission of a PUSCH and power $P_{PUCCH}$ estimated in regard to the transmission of a Physical Uplink Control Channel (hereinafter referred to as a PUCCH). In this case, the power headroom $P_{PH}$ can be found by Equation 3.

$$P_{PH} = P_{max} - P_{PUCCH} - P_{PUSCH} \text{ [dB]} \quad \text{[Math Figure 3]}$$

Figure 6:
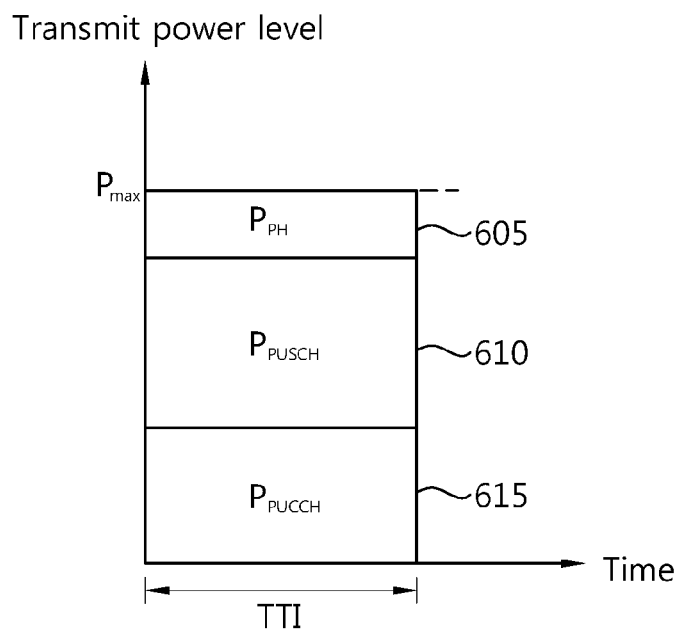
FIG. 6 is a graph shows another example of power headroom to which the present invention is applied in the time-frequency axis.

If the power headroom according to Equation 3 is represented by a graph in the time-frequency axis, it results in FIG. 6. FIG. 6 shows power headroom for one CC.

Referring to FIG. 6, the maximum transmission power $P_{max}$ configured in an UE consists of $P_{PH}$ 605, $P_{PUSCH}$ 610, and $P_{PUCCH}$ 615. That is, the remaining power in which the $P_{PUSCH}$ 610 and the $P_{PUCCH}$ 615 have been subtracted from $P_{max}$ is defined as the $P_{PH}$ 605. Each power is calculated for each Transmission Time Interval (TTI).

A primary serving cell is a unique serving cell which has a UL PCC capable of sending a PUCCH. Accordingly, since a secondary serving cell cannot send a PUCCH, parameters and an operation for a method of reporting the power headroom defined by Equation 2 and the power headroom defined by Equation 3 are not defined.

On the other hand, in a primary serving cell, parameters and an operation for a method of reporting the power headroom defined by Equation 3 may be defined. If an UE has to receive an uplink grant from an eNB, send a PUSCH in a primary serving cell, and simultaneously send a PUCCH in the same subframe according to a predetermined rule, the UE calculates and sends to an eNB all the power headrooms according to Equation 2 and Equation 3 when a power headroom report is triggered.

Dynamic scheduling is used to schedule uplink scheduling through several combinations of CCs. Accordingly, uplink transmission can be performed at the same time through certain combinations of CCs. In this case, the reason why power headroom in which all the certain combinations of CCs are taken into consideration rather than the power headroom of each CC is that the maximum transmission power of each UE is dependent on power headroom in which combined CCs are taken into consideration. Accordingly, power headroom when uplink transmission is performed at the same time through a plurality of CCs under dynamic scheduling, as well as power headroom according to each CC as described above, must be taken into consideration.

To this end, individual power headroom (IPH), combination power headroom (CPH), IPH information, and CPH information are first defined.

The IPH refers to power headroom which is calculated in a CC-specific way when only uplink transmission of one CC configured in an UE is performed. Furthermore, the IPH information refers to a message of a certain format or control information which is used to inform an eNB of CPH.

The CPH refers to power headroom which is calculated in a UE-specific way when uplink transmission through a certain combination of CCs configured in an UE is performed at the same time. Furthermore, the CPH information refers to a message of a certain format or control information which is used to inform an eNB of CPH. If uplink transmission is performed through a combination {CC1, CC2} at the same time, power headroom PH3 into which both the power headroom PH1 of the CC1 and the power headroom PH2 of the CC2 are incorporated becomes CPH. A plurality of CCs becoming a cause to generate CPH is called a Combination CC (CCC), and the number of combination CCs may be 2 or more.

Whether the CPH of what combination CC will be reported and whether the CPH of what combination CC will not be reported is determined on the basis of the determination of an UE or an eNB. For example, an UE reports the CPH of a combination CC in which the variance of the CPH is considered as being a critical value or higher. Alternatively, an UE may report CPH of a combination CC according to whether the combination CC has been implemented in the same RF. For example, it is assumed that CCs configured in an UE are {CC1,CC2,CC3}, {CC1,CC2} are implemented in an RF1, and {CC3} is implemented in an RF2. Here, combination CCs implemented in the same RF1 are {CC1,CC2}. Accordingly, the UE reports CPH regarding the combination {CC1, CC2}. As described above, a combination CC may be configured according to several criteria, and CPH may have various values according to how the combination CC is configured.

Figures 7, 8:
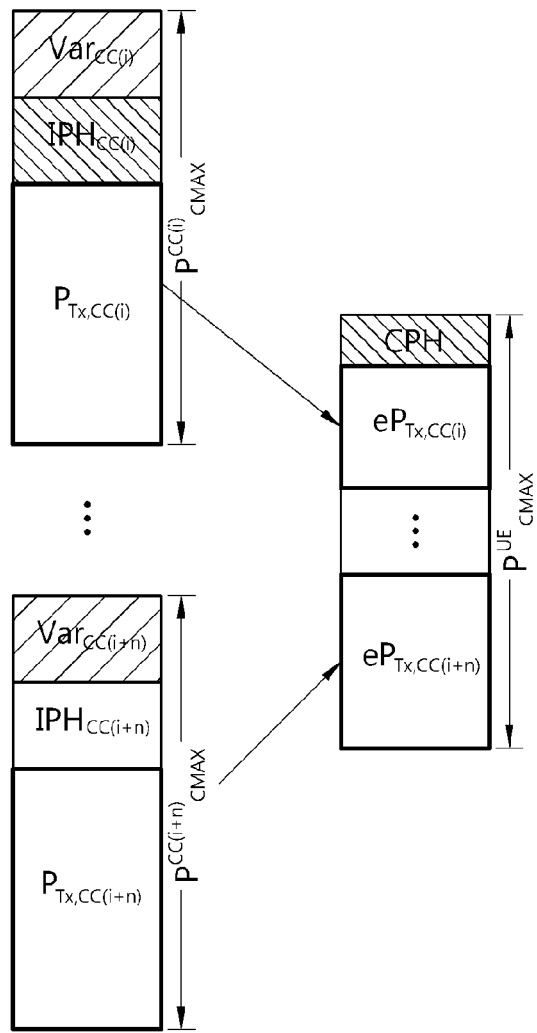
FIG. 7 is an explanatory diagram illustrating the concept of combination power headroom (CPH) according to an embodiment of the present invention.
FIG. 8 is a diagram showing an example of a CCCIF of Type 1 and a relevant CPHF according to the present invention.

FIG. 7 is an explanatory diagram illustrating the concept of CPH according to an embodiment of the present invention.

Referring to FIG. 7, it is assumed that CCs configured in an UE are CC(i) to CC(i+n). The IPH of each CC is described below. A maximum transmission power $PCC^{(i)}{}_{CMAX}$ for the CC(i) is obtained according to Equation 4 below.

$$P_{CMAX}{}^{CC(i)} = Var_{CC(i)} + IPH_{CC(i)} + P_{Tx,CC(i)} \quad \text{[Math Figure 4]}$$

In Equation 4, $Var_{CC(i)}$ is the variance of CC(i), $IPH_{CC(i)}$ is the IPH of CC(i), and $P_{Tx,CC(i)}$ is current uplink transmission power. The $P^{CC(i)}{}_{CMAX}$ value may be the $P_i$ or the maximum transmission power $P_{CMAX}$ determined by an eNB or may be determined by the total maximum transmission power $P^{UE}{}_{CMAX}$ for an UE.

Next, the maximum transmission power $PCC^{(i+n)}{}_{CMAX}$ for CC(i+n) is found by the following Equation.

$$P_{CMAX}{}^{CC(i)} = Var_{CC(i)} + IPH_{CC(i+n)} + P_{Tx,CC(i+n)} \quad \text{[Math Figure 5]}$$

Meanwhile, a maximum transmission power $P^{UE}{}_{CMAX}$ regarding the combinations {CC(i) to CC(i+n)} is found by the following equation.

$$P_{CMAX}{}^{UE} = CPH + P_{Tx,CC(i)} + \ldots + P_{Tx,CC(i+n)} \quad \text{[Math Figure 6]}$$

Referring to Equation 6, CPH is CPH regarding the combination {CC(i) to CC(i+n)}, and $P_{Tx,CC(i)}$ is the component of CC(i) constituting uplink transmission power.

In a situation in which a bandwidth, and MCS, and a path loss are the same, there is a significant difference between CPH and power headrooms $IPH_{CC(i)}$ to $IPH_{CC(i+n)}$ according to each CC for uplink transmission without distortion. If an eNB increases the bandwidth or raises the MCS level in regard to a relevant UE, the UE must set power of the intensity belonging to a region having severe distortion and perform uplink transmission. Such uplink transmission may become a cause to reduce reliability of a link and to greatly degrade the performance of a system. For this reason, CPH is required in order for an eNB to perform accurate dynamic scheduling in a multiple component carrier system.

Meanwhile, although uplink transmissions are performed between CCs having different Radio Frequency (RF) chains at the same time, they are independent in regard to RF distortion. In this case, a CPH report needs not to be additionally performed because an eNB does not have a problem in performing scheduling based on only the IPH information of each CC. As described above, the amount of CPH information can be reduced while selectively performing only the CPH report for a specific combination CC.

An UE has to inform an eNB of CPH when it finds the CPH according to a predetermined rule. This is performed based on CPH information. The CPH information is described below. The CPH information includes at least one Combination CC Indication Field (hereinafter referred to as a CCCIF) and at least one CPH field (hereinafter referred to as a CPHF).

The CCCIF indicates a combination CC. The CCCIF is divided into CCCIF of Type 1 and CCCIF of Type 2 according to a method in which the CCCIF indicates a combination CC.

The CCCIF of Type 1 indicates a single combination CC.

For example, the CCCIF of Type 1 may have the number of bits capable of representing the number of all possible combination CCs. It is assumed that the number of all possible combination CCs for n aggregatable CCs is y. In this case, $y = {}_nC_2 + {}_nC_3 + \ldots + {}_nC_n$. Here, ${}_nC_r$ is a combination and $$\frac{n!}{r!(n-r)!}.$$

Accordingly, the length of the CCCIF of Type 1 is ceiling ($\log_2(y)$). Here, ceiling(a) is a minimum integer greater than a.

For example, it is assumed aggregatable CCs are CC1, CC2, and CC3. All possible combination CCs are four kinds of cases; {CC1, CC2}, {CC2, CC3}, {CC1, CC3}, and {CC1, CC2, CC3}. All the four kinds of cases may be represented by ceiling($\log_2(4)$)=2 bits. Accordingly, if the CCCIF of Type 1 is 00, it may indicate {CC1, CC2}. If the CCCIF of Type 1 is 01, it may indicate {CC2, CC3}. If the CCCIF of Type 1 is 10, it may indicate {CC1, CC3}. If the CCCIF of Type 1 is 11, it may indicate {CC1, CC2, CC3}. The sequence of the combination CCs is meaningless. That is, {CC1, CC2} and {CC2, CC1} are treated as the same combination CC.

For another example, the CCCIF of Type 1 may be a bitmap having the same number of bits as the number of aggregatable CCs. This is described with reference to FIG. 8.

FIG. 8 is a diagram showing an example of the CCCIF of Type 1 and a relevant CPHF according to the present invention.

Referring to FIG. 8, it is assumed that aggregatable CCs are CC1, CC2, CC3, CC4, and CC5 and CCs configured in an UE are CC1, CC2, and CC3. In this case, the CCCIF of Type 1 is a bitmap having a 5-bit length. All possible combination CCs are four kinds of cases; {CC1, CC2}, {CC2, CC3}, {CC1, CC3}, and {CC1, CC2, CC3}. The CCCIF of Type 1 indicating {CC1, CC2} is 11000, the CCCIF of Type 1 indicating {CC2, CC3} is 01100, the CCCIF of Type 1 indicating {CC1, CC3} is 10100, and The CCCIF of Type 1 indicating {CC1, CC2, CC3} is 11100.

That is, in the entire bitmap, only bits mapped to configured CCs are used, and bits mapped to the remaining CC4 and CC5 are 0. The sequence of the combination CCs is meaningless. That is, {CC1, CC2} and {CC2, CC1} are treated as the same combination CC.

A CPHF corresponds to the CCCIF of Type 1 in a 1 to 1 way. For example, CPHFs for respective {CC1, CC2}, {CC2, CC3}, {CC1, CC3}, and {CC1, CC2, CC3} indicate $CPH_1$, $CPH_2$, $CPH_3$, and $CPH_4$. That is, CPH information consisting of the CCCIF of Type 1 and the CPHF may be configured like a first CCCIF+a first CPHF, a second CCCIF+a second CPHF, a third CCCIF+a third CPHF+ .... Each CPH may be determined within a range, such as that shown in Table 1.

Next, the CCCIF of Type 2 indicates all combination CCs which are combined by configured CCs. This is described with reference to FIG. 9.

FIG. 9 is a diagram showing an example of the CCCIF of Type 2 according to the present invention.

Referring to FIG. 9, the CCCIF of Type 2 CCCIF type 2 is a bitmap having the same number of bits as the number of all aggregatable CCs. Each bit of the bitmap is mapped to a specific CC. If a specific bit is 1, the CCCIF of Type 2 indicates all CC combinations in which CCs mapped to the specific bit are taken into consideration.

For example, it is assumed that the number of all aggregatable CCs is 5 and CCs configured in an UE are CC1, CC2, and CC3. If the CCCIF of Type 2 is represented by '11100', the CCCIF of Type 2 indicates all {CC1, CC2}, {CC2, CC3}, {CC1, CC3}, and {CC1, CC2, CC3} which are all combination CCs that may be combined by CC1, CC2, and CC3. That is, one bitmap may represent all combination CCs.

The CCCIF of Type 2 and the CPHF have a 1:m relationship. Here, m is the number of CPHFs. For example, if the CCCIF of Type 2 is '11100', combination CCs indicated by 11100 are {CC1, CC2}, {CC2, CC3}, {CC1, CC3}, and {CC1, CC2, CC3}, and CPHFs for {CC1, CC2}, {CC2, CC3}, {CC1, CC3}, and {CC1, CC2, CC3} indicate $CPH_1$, $CPH_2$, $CPH_3$, and $CPH_4$, respectively. That is, CPH information consisting of the CCCIF of Type 2 and the CPHF is configured like a CCCIF+a first CPHF+a second CPHF+a third CPHF+ ....

The CCCIF of Type 1 and the CCCIF of Type 2 have the following trade-off relationship.

The CCCIF of Type 1 requires individual bitmaps corresponding to the number of combination CCs in order to indicate various combination CCs, but may indicate only a specific single combination CC. On the other hand, the CCCIF of Type 2 may represent various cases of combination CCs through one bitmap signaling, but cannot indicate only specific single combination CC. In order to indicate only a relatively small number of single combination CCs, the CCCIF of Type 1 may be efficient. In order to indicate a relatively large number of single combination CCs, the CCCIF of Type 2 may be efficient. One of the two kinds of the CCCIFs may be used and both the two kinds of the CCCIFs may be used in combination. In the later case, a type distinguishment indicator for distinguishing the CCCIF of Type 1 and the CCCIF of Type 2 from each other is required. The type distinguishment indicator may be a 1 bit indicator.

In relation to the properties of a CCCIF, the CCCIF may be a control message generated in the RRC layer, for example. That is, the CCCIF may be transmitted from an UE to an eNB through RRC signaling, and a CPHF regarding each combination CC indicated by the CCCIF may be transmitted to an eNB through an MAC CE as in the prior art. This means that CPH information may be divided into an RRC message (CCCIF) and an MAC message (CPHF) and then transmitted. Alternatively, both the CCCIF and the CPHF may be transmitted from an UE to an eNB through RRC signaling.

For another example, a CCCIF may be a control message generated in the MAC layer. In this case, a CCCIF and a CPHF, constituting CPH information, may be included in one MAC PDU.

Figure 10:
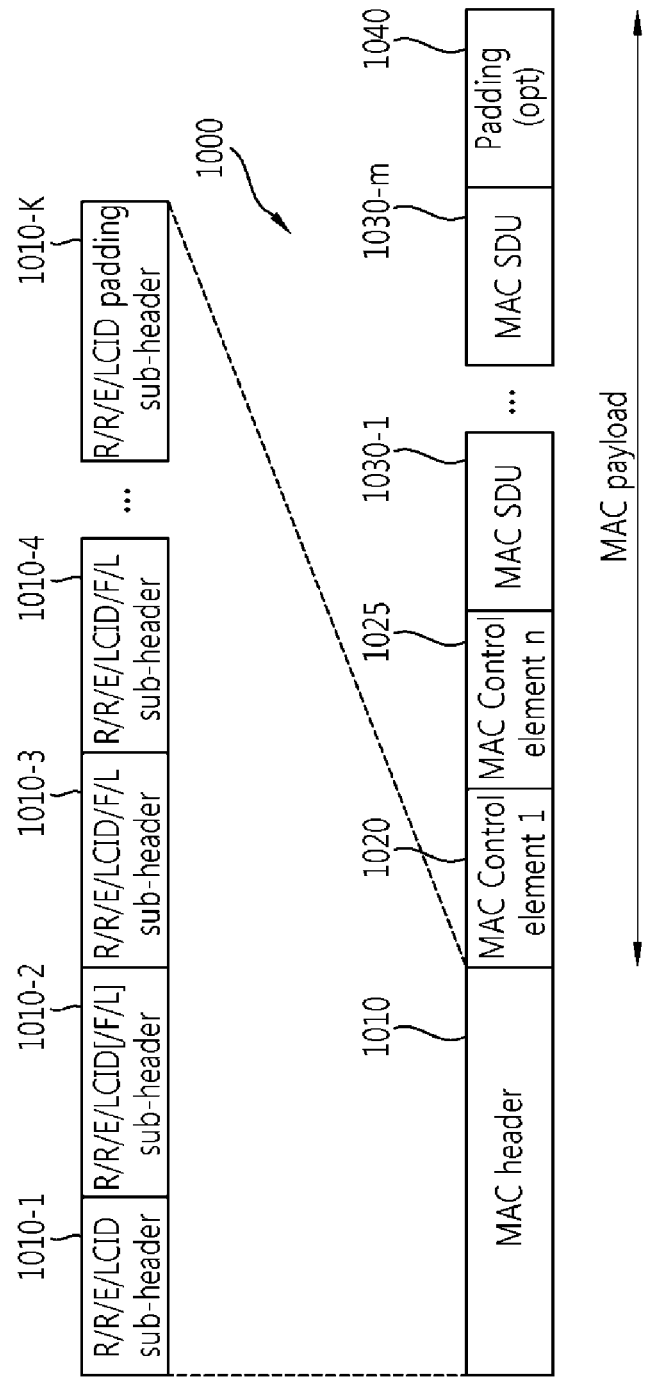
FIG. 10 shows the architecture of an MAC PDU including CPH information according to an embodiment of the present invention.

FIG. 10 shows the architecture of an MAC PDU including CPH information according to an embodiment of the present invention. The MAC PDU is also called a Transport Block (TB).

Referring to FIG. 10, the MAC PDU 1000 includes an MAC header 1010, one or more MAC CEs 1020 to 1025, one or more MAC Service Data Units (SDUs) 1030-1 to 1030-m, and padding 1040.

The MAC CEs 1020 to 1025 are control message generated by the MAC layer.

The MAC SDUs 1030-1 to 1030-m are the same as RLC PDUs transferred by the RLC layer. The padding 1040 is a specific number of bits which are added to the make the size of the MAC PDU constant. The MAC CEs 1020 to 1025, MAC SDUs 1030-1 to 1030-m, and the padding 1040 are collectively called the MAC payload.

The MAC header 1010 includes one or more subheaders 1010-1, 1010-2 to 1010-k. The subheaders 1010-1, 1010-2 to 1010-k correspond to one MAC SDU, one MAC CE, or padding. The sequence of the subheaders 1010-1, 1010-2 to 1010-k is the same as the sequence of the MAC SDUs the MAC CEs, or the paddings corresponding within the MAC PDU 1000.

Each of the subheaders 1010-1, 1010-2 to 1010-k may include four fields; R, R, E, and LCID fields or may include 6 fields; R, R, E, LCID, F, and L fields. The subheader including the four fields is a subheader corresponding to the MAC CE or the padding, and the subheader including the six fields is a subheader corresponding to an MAC CE or an MAC SDU having the length not defined as only 1 octet.

The Logical Channel ID (LCID) field is an ID field for identifying a logical channel, corresponding to an MAC SDU, or for identifying the type of an MAC CE or padding and may be 5 bits.

For example, the LCID field is mapped to an MAC CE, and it indicates the type or function of the mapped MAC CE. For example, the LCID field identifies whether a mapped MAC CE is for a CPH report or IPH information, whether the mapped MAC CE is for a feedback request MAC CE requesting feedback information from an UE, whether the mapped MAC CE is for a Discontinuous Reception (DRX) command MAC CE regarding a non-continuous reception command, or whether the mapped MAC CE is for a contention solution identity MAC CE for a contention solution between UEs in a random access procedure. One LCID field exists in regard to each of the MAC SDU, the MAC CE, or the padding. Table 2 is an example of the LCID field.

TABLE 2

| Index | LCID values |
| --- | --- |
| 00000 | CCCH |
| 00001-01010 | Identity of the logical channel |
| 01011-10101 | Reserved |
| 10110 | UL activation/deactivation |
| 10111 | DL activation/deactivation |
| 11000 | Reference CC Indicator |
| 11001 | Individual Power Headroom Report |
| 11010 | Combination Power Headroom Report |
| 11011 | C-RNTI |
| 11100 | Truncated BSR |
| 11101 | Short BSR |
| 11110 | Long BSR |
| 11111 | Padding |

Referring to Table 2, if the LCID field is 11001, it means that a relevant MAC CE indicates an MAC CE for an IPH report. If the LCID field is 11010, it means that a relevant MAC CE is for an MAC CE for a CPH report.

Figure 11:
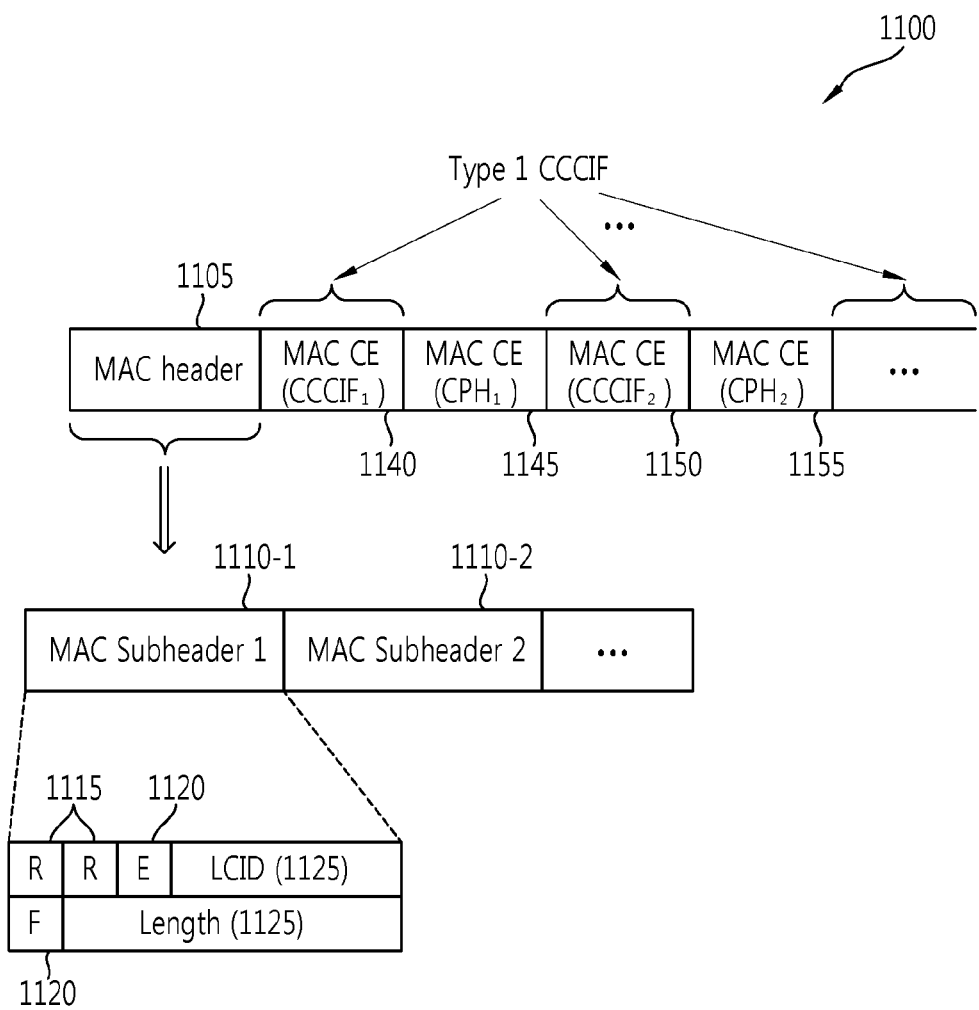
FIG. 11 shows the architecture of an MAC PDU including CPH information according to another embodiment of the present invention.

FIG. 11 shows the architecture of an MAC PDU including the CPH information according to another embodiment of the present invention. The CPH information of FIG. 11 is CPH information according to the CCCIF of Type 1.

Referring to FIG. 11, an MAC PDU 1100 including CPH information includes an MAC header 1105 and a plurality of MAC CEs 1140, 1145, 1150, 1155, . . . . The plurality of MAC CEs 1140, 1145, 1150, 1155, . . . are pieces of CPH information.

The MAC header 1105 includes an MAC subheader1 1110-1, an MAC subheader2 1110-2, . . . . The MAC subheader1 1110-1 includes two R fields 1115, an E field 1120, an LCID field 1125, an F field 1130, and a length field 1135. The length field 1135 indicates the length of the plurality of continuous MAC CEs 1140, 1145, 1150, 1155, . . . which are pieces of CPH information. The LCID field 1125 is indicated by 11010 according to Table 2.

If both the CCCIFs of Type 1 and Type 2 are mixed and used, a type distinguishment indicator for distinguishing the CCCIF of Type 1 and the CCCIF of Type 2 from each other is required. The type distinguishment indicator is a 1 bit indicator and may be included in the R field 1115.

The plurality of MAC CEs 1140, 1145, 1150, 1155, . . . include a first CCCIF $CCCIF_1$, first CPHF $CPH_1$, a second CCCIF $CCCIF_2$, second CPHF $CPH_2$, . . . , respectively.

That is, the CPH information has a structure having a repeated pattern in which a CCCIF and a CPHF mapped to the CCCIF are consecutively arranged over the plurality of MAC CEs 1140, 1145, 1150, 1155, . . . .

The arrangement of the CCCIFs and the CPHFs in FIG. 11 indicates that the number of the CCCIFs of Type 1 and the CPHFs may be plural within the MAC PDU, but the present invention is not limited thereto. Accordingly, the plurality of MAC CEs 1140, 1145, 1150, 1155, . . . may sequentially include the CCCIFs and may include the CPHFs from the MAC CE at which the CCCIFs are ended. Each CPHF is determined within a range, such as that shown in Table 1.

Figure 12:
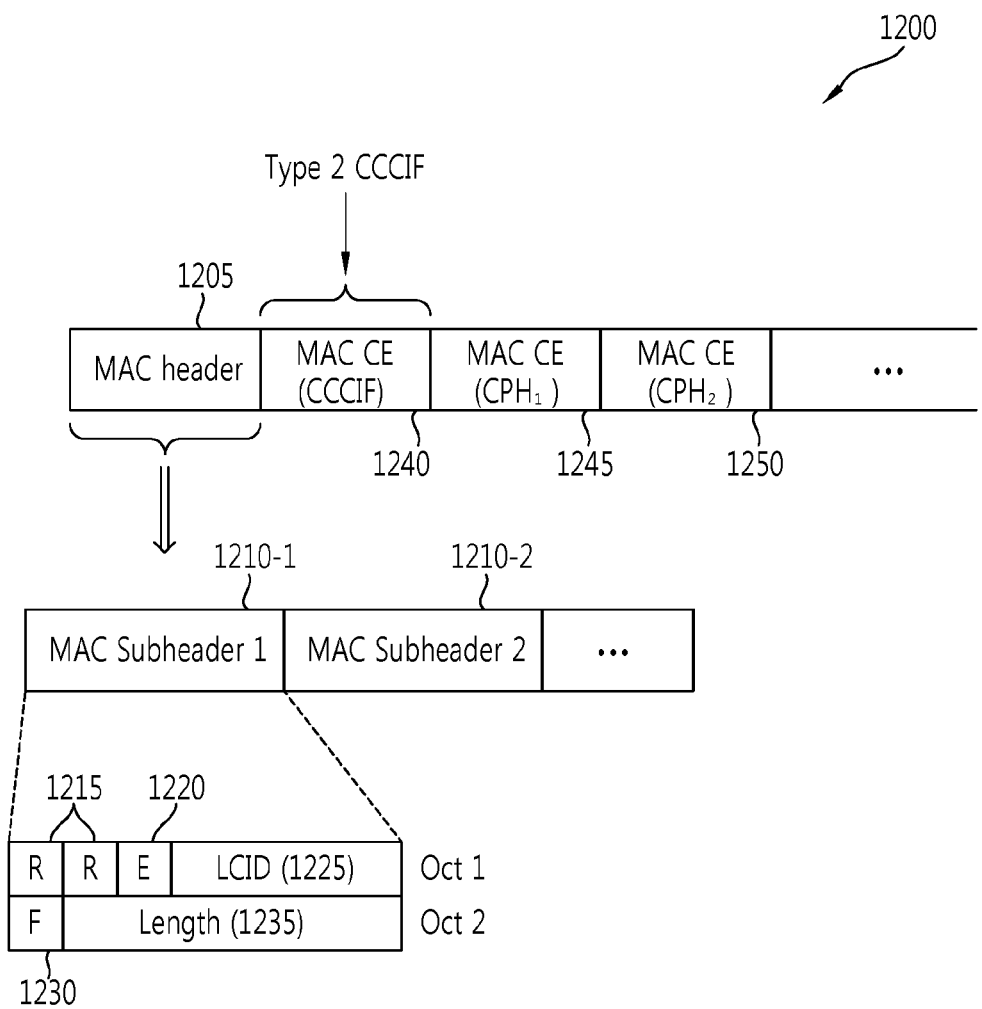
FIG. 12 shows the architecture of an MAC PDU including CPH information according to yet another embodiment of the present invention.

FIG. 12 shows the architecture of an MAC PDU including CPH information according to yet another embodiment of the present invention. The CPH information of FIG. 12 is CPH information according to the CCCIF of Type 2.

Referring to FIG. 12, the MAC PDU 1200 including the CPH information includes an MAC header 1205 and a plurality of MAC CEs 1240, 1245, 1250, . . . . The plurality of MAC CEs 1240, 1245, 1250, 1255, . . . are pieces of CPH information.

The MAC header 1205 includes an MAC subheader1 1210-1, an MAC subheader2 1210-2, . . . . The MAC subheader1 1210-1 includes two R fields 1215, an E field 1220, an LCID field 1225, an F field 1230, and a length field 1235. The length field 1235 indicates the length of the plurality of consecutive MAC CEs 1240, 1245, 1250, . . . which are pieces of CPH information. The LCID field 1225 is indicated by 11010 according to Table 2.

If both the CCCIFs of Type 1 and Type 2 are mixed and used, a type distinguishment indicator for distinguishing the CCCIF of Type 1 and the CCCIF of Type 2 from each other is required. The type distinguishment indicator is a 1 bit indicator, and it may be included in the R field 1215.

The plurality of MAC CEs 1240, 1245, 1250, . . . include a CCCIF of Type 2 CCCIF, a first CPHF $CPH_1$, a second CCCIF $CCCIF_2$, . . . , respectively.

That is, the CPH information has a structure having repeated patterns in each of which a CCCIF and a CPHF mapped to the CCCIF are consecutively arranged over the plurality of MAC CEs 1240, 1245, 1250, . . . . Meanwhile, a rule for the sequence of a number of arranged CPHFs may differ according to implementations, but is required as an agreement that is known to both an eNB and an UE.

The arrangement of the CCCIFs and the CPHFs in FIG. 12 indicates that one CCCIF of Type 2 and a number of CPHFs may exist within the MAC PDU, but the present invention is not limited thereto. Accordingly, the CCCIF of Type 2 may be disposed between the CPHFs or may be disposed at the end of the CPHF after all the CPHFs are arranged. Each CPHF is determined within a range, such as that shown in Table 1.

In this specification, the definition and configuration forms of CPH information have been described above. Hereinafter, a method of an UE sending CPH information to an eNB is described.

Figure 13:
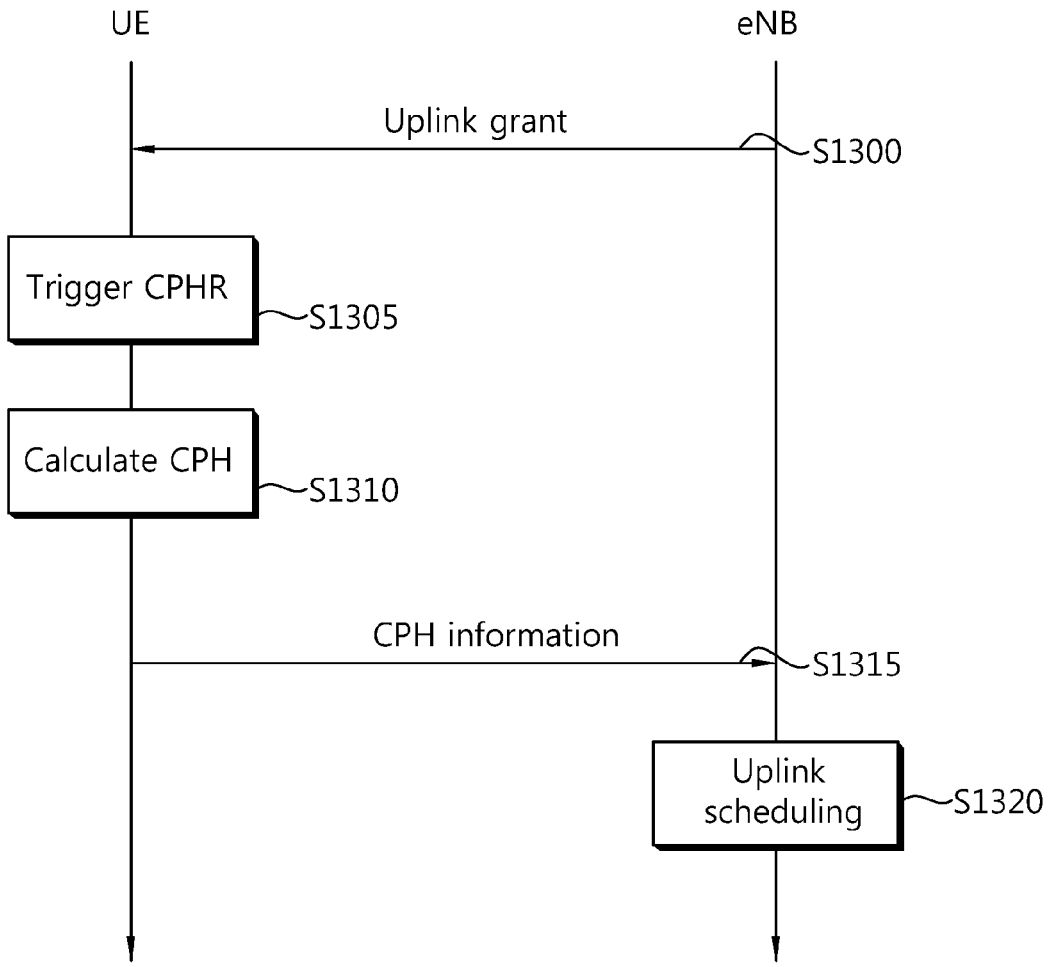
FIG. 13 is a flowchart illustrating a method of transmitting CPH information according to an embodiment of the present invention.

FIG. 13 is a flowchart illustrating a method of transmitting CPH information according to an embodiment of the present invention.

Referring to FIG. 13, an eNB sends an uplink grant to an UE at step S1300. An example of the uplink grant is shown in Table 3.

TABLE 3

Flag for format0/format1A differentiation - 1 bit, where value 0 indicates format 0 and value 1 indicates format 1A
Frequency hopping flag - 1 bit
Resource block assignment and hopping resource allocation- $\lceil \log_2(N_{RB}^{UL}(N_{RB}^{UL}+1)/2) \rceil$ bits
    For PUSCH hopping:
        $N_{UL\_hop}$ MSB bits are used to obtain the value of $ñ_{PRB}(i)$
        ($\lceil \log_2(N_{RB}^{UL}(N_{RB}^{UL}+1)/2) \rceil - N_{UL\_hop}$) bits provide the resource allocation of the first slot in the UL subframe
    For non-hopping PUSCH:
        ($\lceil \log_2(N_{RB}^{UL}(N_{RB}^{UL}+1)/2) \rceil$) bits provide the resource allocation in the UL subframe
Modulation and coding scheme and redundancy version - 5 bits
New data indicator - 1 bit
TPC command for scheduled PUSCH - 2 bits
Cyclic shift for DM RS - 3 bits
UL index - 2 bits (this field is present only for TDD operation with uplink-downlink configuration 0)
    Downlink Assignment Index (DAI) - 2 bits (this field is present only for TDD operation with uplink-downlink configurations 1-6)
CQI request - 1 bit
Carrier Index Field (CIF) - 3 bits(this field is present only for Carrier Aggregation)

Referring to Table 3, the uplink grant is information corresponding to the format 0 of Downlink Control Information (DCI) transmitted on a PDCCH, and it includes pieces of information, such as RB, a Modulation and Coding Scheme (MCS), and TPC.

The UE triggers a CPH report (CPHR) when a triggering condition is satisfied at step S1305. Here, triggering is an operation in which the UE enters a state in which it can perform the CPH report. When the CPH report is triggered, the UE is prepared to report CPH on the basis of the uplink grant provided by the eNB. The triggering condition is various, and the UE can consistently monitor whether the triggering condition is satisfied. The triggering condition is described later.

The UE calculates CPH regarding a combination CC at step S1310. The method of calculating the CPH differs from the method of calculating power headroom according to Equation 1 to Equation 3 only in that the combination CC is a target, but may the method of calculating power headroom according to Equation 1 to Equation 3 or may use an additional method unique to CPH. Meanwhile, when the combination CC is {CC1, CC2, CC3}, uplink scheduling regarding CC1 and CC2 exist, but uplink scheduling regarding CC3 may not exist. CPH is calculated in preparation for scheduling to be performed by an eNB in the future although the CPH is not scheduled at present. Accordingly, the CPH is calculated on the basis of resources and an MCS level which are allocated by default or virtually in regard to the CC3.

The UE sends CPH information, informing the eNB of the calculated CPH, to the eNB at step S1315. The CPH information is the same as that described with reference to FIGS. 8 to 10 and may be transmitted in the form of RRC signaling or an MAC message.

The eNB performs uplink scheduling for the UE within the range of the CPH of the UE on the basis of the CPH information at step S1320.

FIG. 13 shows that only a CPH report according to the present invention is performed, but an IPH report may also be performed in parallel to the CPH report. In this case, IPH may be calculated, and the existing method of sending IPH information may be used.

Hereinafter, the condition that a CPH report is triggered is described.

Figure 14:
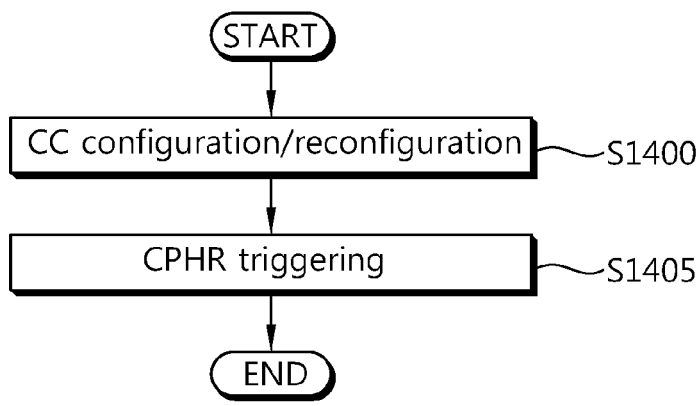
FIG. 14 is a flowchart illustrating a triggering condition on a CPH report according to an embodiment of the present invention.

FIG. 14 is a flowchart illustrating a triggering condition on a CPH report according to an embodiment of the present invention. The triggering condition is called triggering according to a CC configuration.

Referring to FIG. 14, an UE configures or reconfigures a CC according to an instruction of an eNB at step S1400. In general, the eNB calculates uplink resources necessary for the UE by taking an scheduling request (SR), buffer state report (BSR) information, etc., received from the UE, into account. Furthermore, the number of CCs to be configured in the UE and a CC combination are determined by taking resources, a network policy, etc. which are available to the eNB, into consideration.

For example, if the number of CCs to be configured in the UE is 3 and the CCs include No. 1 CC to No. 5 CC, three of the five CCs may be selected and a CC combination, such as {CC1, CC2, CC3} or {CC1, CC3, CC5}, may be configured for the UE. However, the eNB may change the number of CCs configured for the UE, an index, a band, and a combination. Accordingly, when the eNB instructs the configuration or reconfiguration of CCs regarding the UE, the UE configures or reconfigures CCs. The configuration or reconfiguration of the CCs is indicated through an RRC connection establishment procedure, an RRC connection re-establishment procedure, or an RRC connection reconfiguration procedure.

The UE triggers a CPH report based on the configuration or reconfiguration of the CCs at step S1405. If the CCs are combined, only a CPH report for a combination CC whose CPH or variance is determined to be a threshold or higher is triggered.

Figure 15:
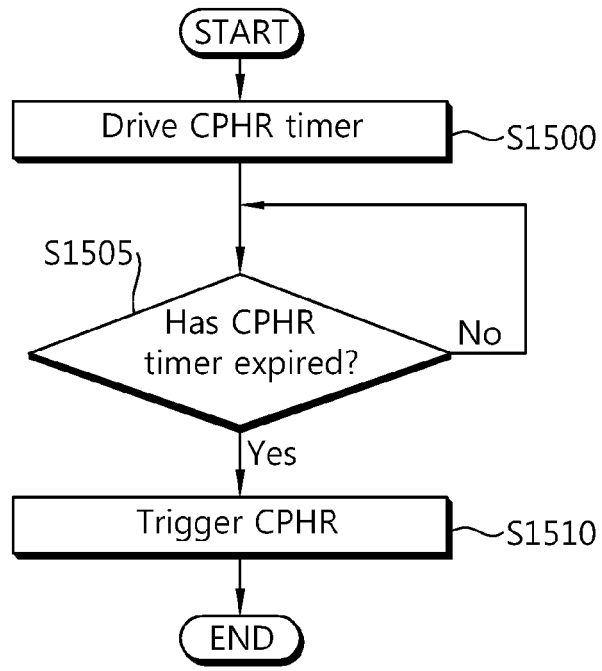
FIG. 15 is a flowchart illustrating a triggering condition on a CPH report according to another embodiment of the present invention.

FIG. 15 is a flowchart illustrating a triggering condition on a CPH report according to another embodiment of the present invention. The triggering condition is called triggering by a timer.

Referring to FIG. 15, an UE drives a CPH Report Timer (CPHR Timer) at step S1500. Since CPH is frequently changed, the CPHR timer may be periodically driven. For example, if a New Data Indicator (NDI) included in an uplink grant indicates new transmission, the CPHR timer may be driven.

The UE determines whether the CPHR timer has expired at step S1505. If, as a result of the determination, the CPHR timer has expired, the UE triggers a CPH report at step S1510. If, as a result of the determination, the CPHR timer has not expired, the UE waits until the CPHR timer expires.

Here, the CPHR timer is driven separately from an IPH report timer.

Meanwhile, the UE can receive a timer value for setting the CPHR timer from an eNB through RRC signaling. The timer value may be applied to the IPH report timer. Furthermore, the timer value may be identically applied to the CPHR timer. Furthermore, the UE may receive an additional timer value for the CPHR timer from an eNB through RRC signaling.

For example, a point of time when an IPH report timer is driven may quite differ from a point of time when a CPHR timer is driven. Alternatively, the IPH report timer and the CPHR timer may be operated at the same time. Here, a value set in the IPH report timer may be identical with or quite different from a value set in the CPHR timer.

Figure 16:
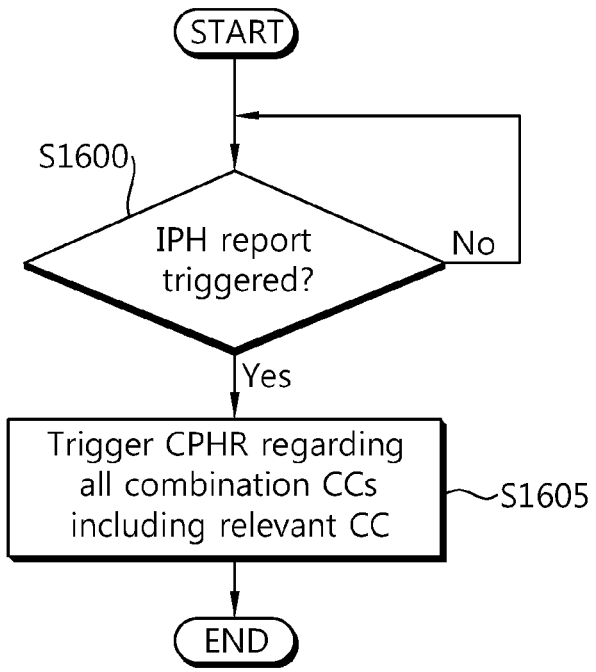
FIG. 16 is a flowchart illustrating a triggering condition on a CPH report according to yet another embodiment of the present invention.

FIG. 16 is a flowchart illustrating a triggering condition on a CPH report according to yet another embodiment of the present invention. The triggering condition is called triggering by an individual CC.

Referring to FIG. 16, an UE determines whether an IPH report for a specific CC has been triggered at step S1600. If, as a result of the determination, the IPH report for a specific CC is determined to have been triggered, the UE triggers a CPH report regarding all combination CCs including a specific CC at step S1605. That is, the triggering of a CPH report is induced by the IPH report.

For example, it is assumed that CCs now configured for an UE are CC1, CC2, and CC3 and combination CCs are {CC1, CC2}, {CC2, CC3}, {CC1, CC3}, and {CC1, CC2, CC3}. If an IPH report for the CC1 is triggered, an UE triggers {CC1, CC2}, {CC1, CC3}, {CC1, CC2, CC3} that are combination CCs including the CC1.

Figure 17:
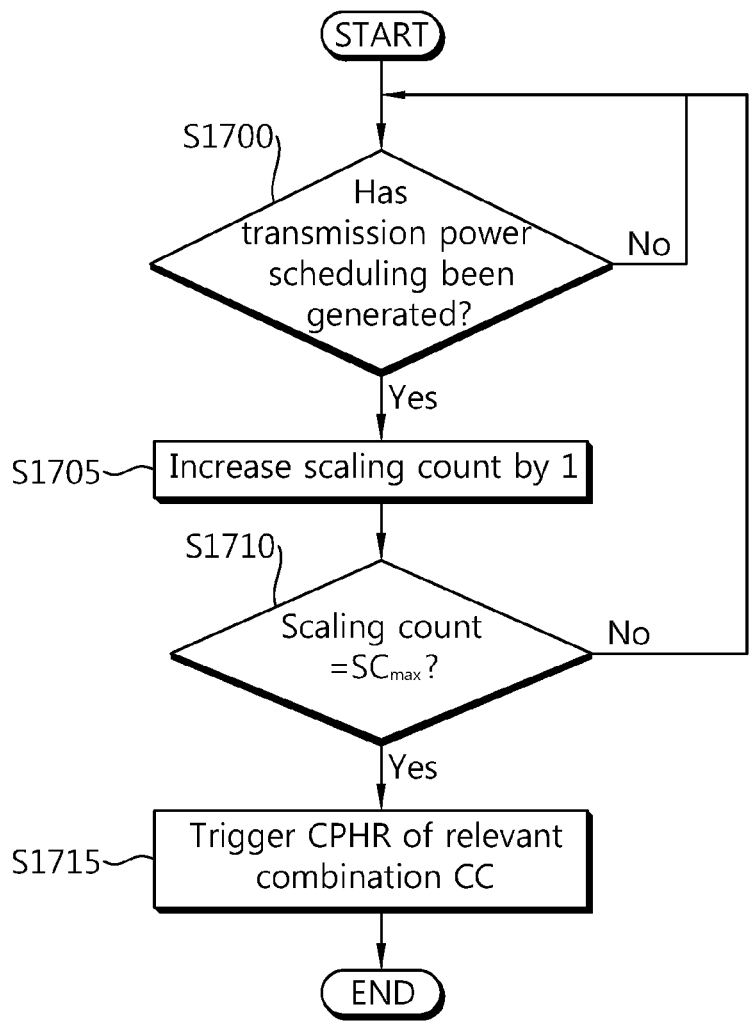
FIG. 17 is a flowchart illustrating a triggering condition on a CPH report according to further yet another embodiment of the present invention.

FIG. 17 is a flowchart illustrating a triggering condition on a CPH report according to further yet another embodiment of the present invention. The triggering condition is called triggering by scaling.

Referring to FIG. 17, an UE determines whether a Transmission Power Scaling (TPS) has been generated according to each combination CC at step S1700. Here, the transmission power scaling is an operation of an UE reducing uplink transmission power if the uplink maximum transmission power of the UE is exceeded owing to dynamic scheduling by an eNB. When the transmission power scaling is generated, CPH has a negative value smaller than 0 dB.

If, as a result of the determination, the transmission power scaling for a specific combination CC is determined not to have been generated, the UE determines whether subsequent transmission power scaling has been generated at step S1700. If, as a result of the determination, the transmission power scaling for a specific combination CC is determined to have been generated, the UE increases a Scaling Count (SC) by 1 at step S1705. The scaling count is operated per combination CC. For example, a first scaling count may be applied to a first combination CC, and a second scaling count may be applied to a second combination CC.

Next, the UE determines whether the scaling count is equal to a maximum scaling count value $SC_{max}$ at step S1710. The maximum scaling count value may be transmitted to the UE in the form of higher layer signaling, such as RRC signaling, an MAC message, or a message of a physical layer level. A eNB can control the frequency of CPHR triggering by controlling the maximum scaling count value according to a communication situation. This is because frequent triggering may become overhead. For example, the maximum scaling count value may be 5 to 7. How the maximum scaling count value is configured is an issue of an implementation.

If, as a result of the determination, the scaling count of a specific combination CC is determined to be equal to the maximum scaling count value $SC_{max}$, the UE triggers the CPH report of the specific combination CC at step S1715. After the CPH report is triggered and completed, the scaling count is reset, and counting newly begins.

If, as a result of the determination, the scaling count of the specific combination CC is determined not to be equal to the maximum scaling count value $SC_{max}$, the UE determines whether transmission power scaling is generated again at step S1700.

In this specification, several kinds of CPH report triggerings have been described. That is, the CPH report triggering include triggering by a CC configuration, triggering by a timer, triggering by an individual CC, and triggering by scaling.

Furthermore, each of the triggering methods may be independently applied to a CPH report or one or more of the triggering methods may be combined and applied. If all the triggering methods are applied, triggering by a CC configuration, triggering by a timer, triggering by an individual CC, and triggering by scaling may be sequentially applied.

Furthermore, if the triggering methods are combined and sequentially applied as described above, an UE may perform a PHR using a triggering sequence different from the above triggering sequence according to preset rules with a system.

Figure 18:
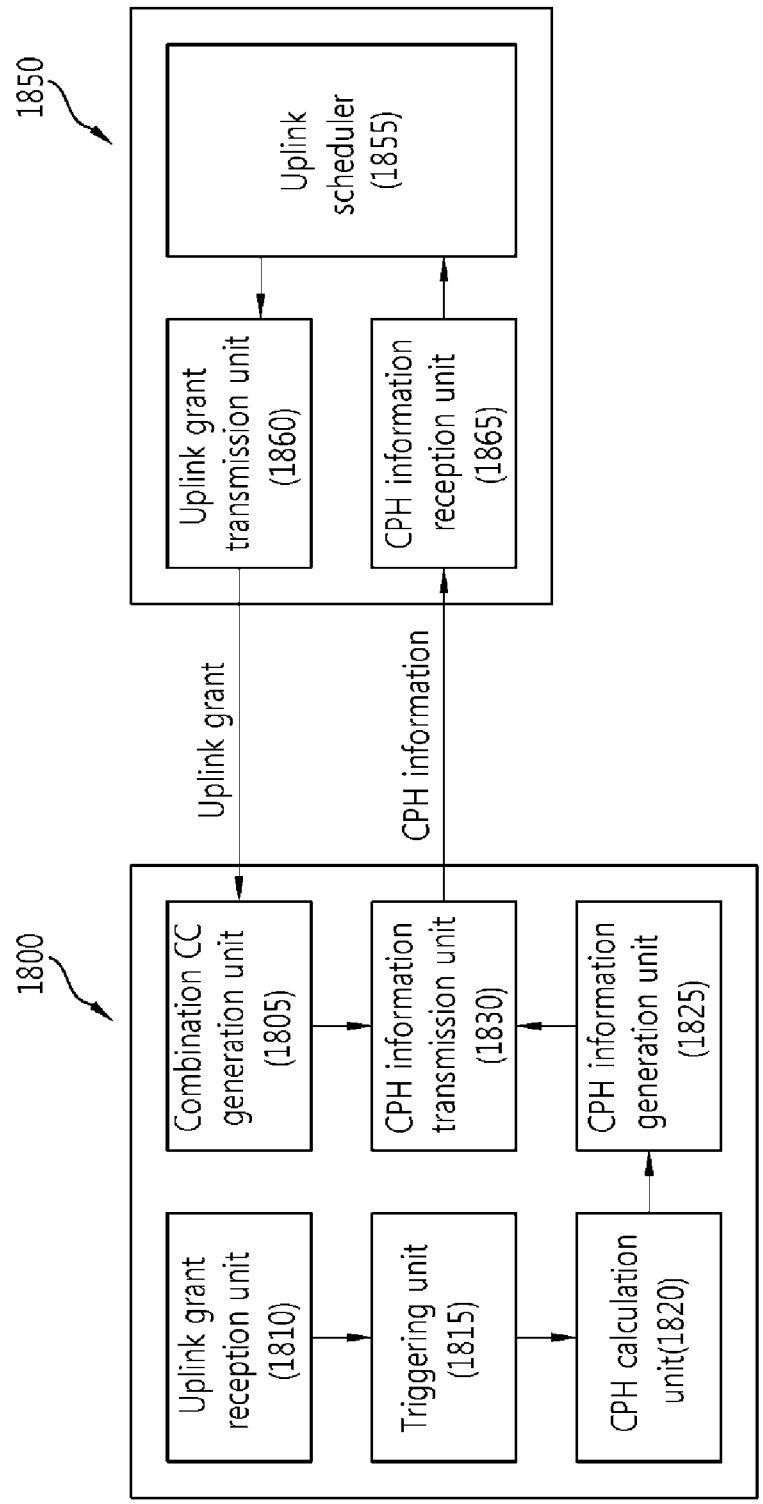
FIG. 18 is a block diagram showing an apparatus for transmitting and receiving CPH information according to an embodiment of the present invention.

FIG. 18 is a block diagram showing an apparatus for transmitting and receiving CPH information according to an embodiment of the present invention.

Referring to FIG. 18, the apparatus 1800 for transmitting CPH information includes an uplink grant reception unit 1805, a combination CC generation unit 1810, a triggering unit 1815, a CPH calculation unit 1820, a CPH information generation unit 1825, and a CPH information transmission unit 1830.

The uplink grant reception unit 1805 receives an uplink grant from an apparatus 1850 for receiving CPH information. An example of the uplink grant is shown in Table 3.

The combination CC generation unit 1810 generates all possible cases of combination CCs and combination CCs requiring a CPH report on the basis of CCs configured in the apparatus 1800 for transmitting CPH information. For example, the combination CC generation unit 1810 may generate all possible cases of combination CCs when the configuration of a CC is changed. Alternatively, only necessary combination CCs may be generated according to whether a plurality of CCs has been implemented in different RF chains.

The triggering unit 1815 triggers a CPH report on the basis of a triggering condition regarding a combination CC generated by the combination CC generation unit 1810. In the triggering method, the triggering of the CPH report may include triggering by a CC configuration, triggering by a timer, triggering by an individual CC, and triggering by scaling, as described above. The triggering unit 1815 may apply the triggering methods independently or a combination of two or more of the triggering methods.

When the CPH report for a specific combination CC is triggered by the triggering unit 1815, the CPH calculation unit 1820 calculates CPH regarding the specific combination CC.

The CPH information generation unit 1825 generates CPH information on the basis of the CPH calculated by the CPH calculation unit 1820. The method of generating the CPH information has been described with reference to FIGS. 8 to 12.

The CPH information transmission unit 1830 sends the CPH information, generated by the CPH information generation unit 1825, to the apparatus 1850 for receiving CPH information in the form of an RRC message or an MAC message on the basis of the uplink grant received by the uplink grant reception unit 1805.

The apparatus 1850 for receiving CPH information includes an uplink scheduler 1855, an uplink grant transmission unit 1860, and a CPH information reception unit 1865.

The uplink scheduler 1855 performs dynamic uplink scheduling within a range that a range of the uplink maximum transmission power of the apparatus 1800 for transmitting CPH information on the basis of the CPH information received by the CPH information reception unit 1865. Furthermore, the uplink scheduler 1855 generates an uplink grant and sends it to the uplink grant transmission unit 1860.

The uplink grant transmission unit 1860 sends the uplink grant, received from the uplink scheduler 1855, to the apparatus 1800 for transmitting CPH information.

The CPH information reception unit 1865 receives the CPH information from the apparatus 1800 for transmitting CPH information.

A maximum transmission power set in an UE is influenced by the power coordination of the UE irrespective of whether a system is a single component carrier system or a multiple component carrier system. The term 'power coordination' means that an uplink maximum transmission power set in an UE is reduced within a permitted range, and the power coordination may be called Maximum Power Reduction (MPR). Furthermore, the amount of power reduced by the power coordination is called a power coordination amount. The reason why the maximum transmission power set in the UE is reduced is as follows.

When a transmission bandwidth is determined, a relevant signal is controlled so that it is transmitted with respect to only a bandwidth set by a filter. Here, with an increase in the width of the bandwidth, the number of tabs (e.g., registers) forming a filter is increased. In order to satisfy an ideal filter characteristic, the design complexity and size of a filter is exponentially increased although the bandwidth is the same.

Accordingly, interference power for a band in which uplink transmission should not be performed may be generated according to the characteristic of a filter. In order to reduce the interference power, it is necessary to reduce generated interference power by reducing a maximum transmission power through power coordination. When calculating a surplus power for this operation, an UE subtracts the value o power coordination from the maximum transmission power and then calculates the surplus power for the remaining value. The value of power coordination may be part of the value $Var_{CC(i)}$ in Equation 4 and Equation 5.

Combination Power Coordination (CPC) means the value of power coordination which is calculated by an UE when scheduling is obtained by configuring CCs. An UE may calculate the value of combination power coordination by adding the values of power coordination for respective CCs or may calculate one value for a combination CC. As an example of the combination power coordination, when CC1 and CC2 are used for transmission, the value of power coordination of 3 dB may be calculated. When CC1, CC2, and CC3 are calculated at the same time, the value of combination power coordination may be increased to 5 dB.

Furthermore, when the combination power coordination is not scheduled, it may be calculated according to the allocation of virtual resources.

Figure 19:
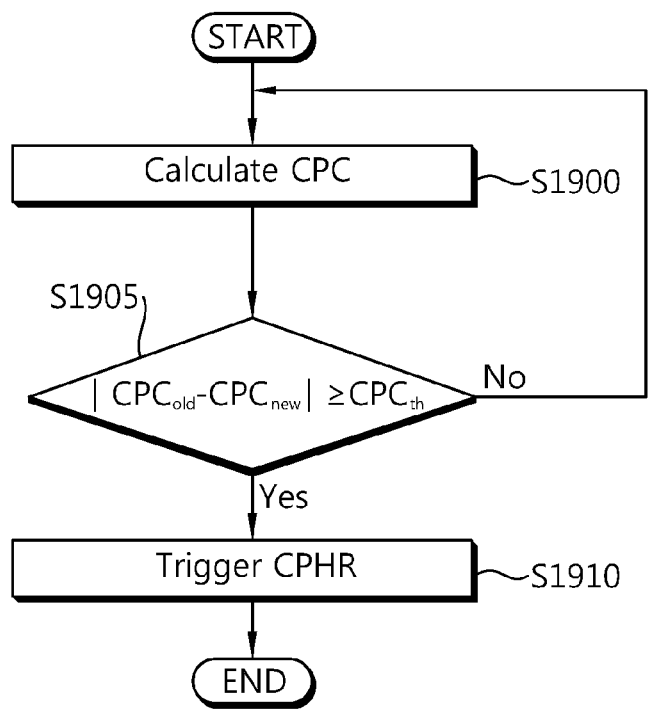
FIG. 19 is a flowchart illustrating a triggering condition on a CPH report according to further yet another embodiment of the present invention.

FIG. 19 is a flowchart illustrating a triggering condition on a CPH report according to further yet another embodiment of the present invention. The triggering condition is called triggering by combination power coordination. This is a scheme for triggering a Combination Power Headroom Report (CPHR) for a relevant CC combination when the value of combination power coordination is changed higher a certain level with respect to a specific CC combination.

Referring to FIG. 19, an UE calculates a value of combination power coordination CPC at step S1900. The value of combination power coordination may be calculated when the configuration of a CC is changed or may be calculated when scheduling for a specific CC combination is granted.

The UE determines whether the absolute value of a difference between a previous value of combination power coordination $CPC_{old}$ and a new value of combination power coordination $CPC_{new}$ (i.e., the absolute value of a variance of a combination power coordination value) is greater than or equal to a threshold $CPC_{th}$ at step S1905.

If, as a result of the determination, the absolute value is greater than or equal to the threshold, the UE triggers a CPH report regarding a combination CC corresponding to the value of the combination power coordination at step S1910.

If, as a result of the determination, the absolute value is smaller than the threshold, the UE does not trigger a combination surplus power report and calculates a value of combination power coordination next time at step S1900.

Figure 20:
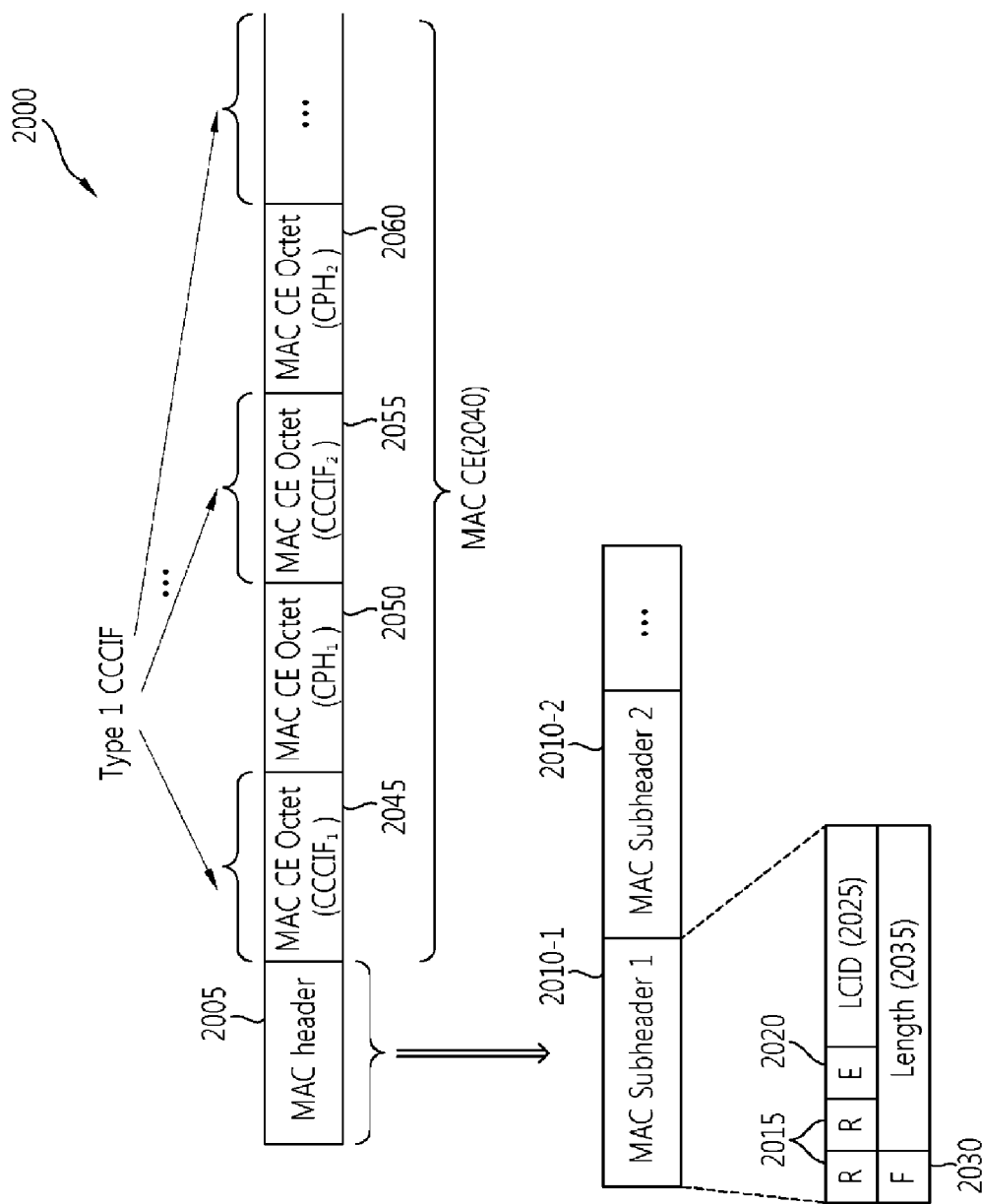
FIG. 20 shows the architecture of an MAC PDU including CPH information according to yet another embodiment of the present invention.

FIG. 20 shows the architecture of an MAC PDU including CPH information according to yet another embodiment of the present invention. The CPH information is CPH information according to the CCCIF of Type 1.

Referring to FIG. 20, the MAC PDU 2000 including the CPH information includes an MAC header 2005 and an MAC CE 2040.

The MAC header 2005 includes an MAC subheader1 2010-1, an MAC subheader2 2010-2, . . . . The MAC subheader1 2010-1 includes two R fields 2015, an E field 2020, an LCID field 2025, an F field 2030, and a length field 2035. The length field 2035 indicates the length of the MAC CE 2040 which is CPH information. Assuming that the number of branches of a combination is 8 in an architecture, such as that shown in FIG. 20, the length field 2035 may have 8 (octet)×8 (branches)=a value of 64 bits. The LCID field 2025 is indicated by 11010 according to Table 2.

The MAC CE 2040 includes at least one MAC CE octet (MAC CE octet). The MAC CE octet is the bit length defined by a multiple of 8. Each MAC CE octet may be the CCCIF of Type 1 or a CPHF. A pattern in which one CCCIF and one CPHF are paired and arranged within one MAC CE 2040 may be repeated. That is, CCCIFs may be disposed like a CCCIF $CCCIF_1$ 2045, a CPHF $CPH_1$ 2050, a CCCIF $CCCIF_2$ 2055, a CPHF $CPH_2$ 2060, . . . .

The above is only an example. If one CCCIF and one CPHF have only to be paired, the CCCIF may be first disposed and the CPHF may be then disposed.

If both the CCCIFs of Type 1 and Type 2 are mixed and used, a type distinguishment indicator for distinguishing the CCCIF of Type 1 and the CCCIF of Type 2 from each is required. The type distinguishment indicator may be a 1 bit indicator and may be included in the R field 2015 and may be included in the first bit of the first MAC CE octet.

FIG. 20 shows an example in which each of the plurality of MAC CE octets belonging to one MAC CE 2040 is used as a CCCIF or a CPHF. One MAC CE may include a plurality of CCCIFs or a plurality of CPHFs or both. This is different from FIG. 11 in which one MAC CE includes one CCCIF or one CPHF or both.

The arrangement of the CCCIFs and the CPHFs in FIG. 20 indicates that the number of CCCIFs of Type 1 and the number of CPHFs may be plural within the MAC PDU, but the present invention is not limited thereto. Accordingly, the CCCIFs may be contiguously within the MAC CE 2240 and the CPHFs may be contiguously within the MAC CE 2240. Each CPHF is determined within a range, such as that shown in Table 1.

Figure 21:
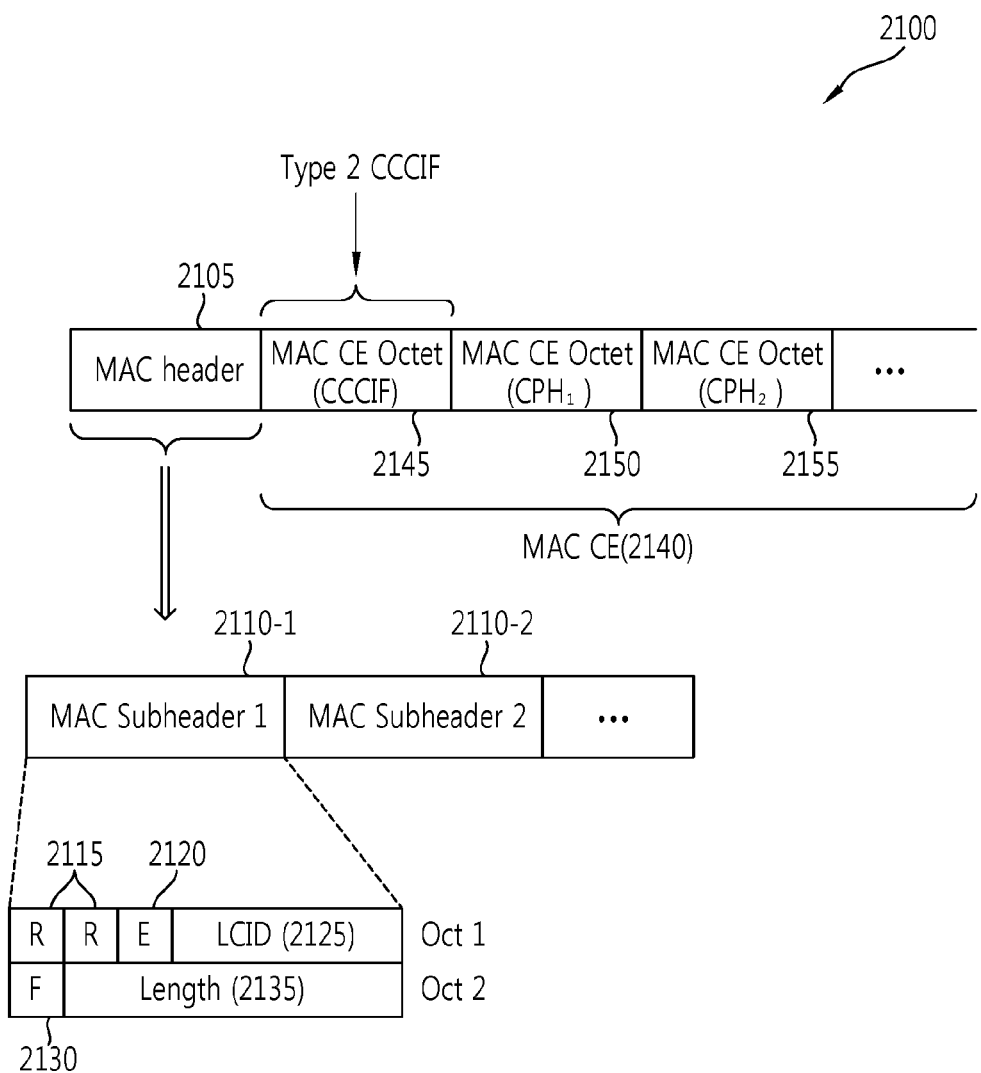
FIG. 21 shows the architecture of an MAC PDU including CPH information according to further yet another embodiment of the present invention.

FIG. 21 shows the architecture of an MAC PDU including CPH information according to further yet another embodiment of the present invention. The CPH information is CPH information according to the CCCIF of Type 2.

Referring to FIG. 21, the MAC PDU 2100 including the CPH information includes an MAC header 2105 and an MAC CE 2140.

The MAC header 2105 includes an MAC subheader1 2110-1, an MAC subheader2 2110-2, . . . . The MAC subheader1 2110-1 includes two R fields 2115, an E field 2120, an LCID field 2125, an F field 2130, and a length field 2135. The length field 2135 indicates the length of the MAC CE 2140 which is CPH information. It is assumed that the number of branches of a combination is 8 in a structure, such as that shown in FIG. 21. The length field 2125 may have 8 (octet)×8 (branches)=a value of 64 bits. The LCID field 2125 is indicated by 11010 according to Table 2.

If both the CCCIFs of Type 1 and Type 2 are combined and used, a type distinguishment indicator for distinguishing the CCCIF of Type 1 and the CCCIF of Type 2 from each other is required. The type distinguishment indicator may be a 1 bit indicator and may be included in the R field 2115 and may be included in the first bit of the first MAC CE octet.

The MAC CE 2140 includes at least one MAC CE octet. Each MAC CE octet is the CCCIF of Type 2 or a combination surplus power field. For example, assuming that the MAC CE 2140 includes three MAC CE octets, the first MAC CE octet 2145 may be a CCCIF of Type 2, the second MAC CE octet 2150 may be a first CPHF $CPH_1$, and the third MAC CE octet 2155 may be a second CCCIF $CCCIF_2$.

That is, the CPH information has a structure in which one CCCIF and a number of CPHFs are consecutively disposed over one MAC CE 2140. Meanwhile, a rule for the sequence of a number of disposed CPHFs may be change according to implementations, but a rule known to both an eNB and an UE is regulated.

The arrangement of the CCCIFs and the CPHFs in FIG. 21 indicates that one CCCIF of Type 2 and a number of CPHFs may exist within the MAC PDU, but the present invention is not limited thereto. Accordingly, the CCCIF of Type 2 may be disposed between the CPHFs or may be disposed at the end of the CPHF after all the CPHFs are disposed. Each CPHF is determined within a range, such as that shown in Table 1.

FIG. 21 shows an example in which a plurality of MAC CE octets belonging to one MAC CE 2140 is used as a CCCIF or a CPHF. One MAC CE may include a plurality of CCCIF or a plurality of CPHF or both. This is different from FIG. 12 in which one MAC CE includes one CCCIF or one CPHF or both.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not restricted by the embodiments, but should be interpreted based on the following claims. Accordingly, all technical spirits within an equivalent range should be interpreted as being included in the scope of the present invention.

The invention claimed is:

1. A method of a User Equipment (UE) transmitting a power headroom report in a multiple component carrier system, the method comprising:
   calculating Combination Power Headroom (CPH) which is power headroom calculated in a UE-specific way based on uplink transmission through a plurality of component carriers configured in the UE;
   generating CPH information used to inform an eNodeB (eNB) of the CPH;
   transmitting the CPH information to the eNB; and
   determining whether a triggering condition is satisfied before calculating the CPH, the triggering condition being satisfied when the UE enters a state in which the UE sends the CPH information,
   wherein the CPH information comprises a combination indication field indicating a combination, composed of the plurality of component carriers, and a Combination Power Headroom Field (CPHF) indicating the CPH, and
   wherein the triggering condition is determined to be satisfied when a configuration of the plurality of component carriers configured in the UE is changed, when a timer for triggering the transmission of the CPH information expires, when a power headroom report for one of the plurality of component carriers configured in the UE is triggered, or when a scaling count indicating a number of times that an uplink transmission power of the UE exceeds an uplink maximum transmission power is equal to a predetermined threshold, or
   the triggering condition is determined to be satisfied based on a result obtained by comparing a variance of a value of a combination power coordination regarding the plurality of component carriers, configured in the UE, with a predetermined threshold.

2. The method of claim 1, further comprising receiving an uplink grant to allocate uplink scheduling for the UE from the eNB, before calculating the CPH,
   wherein the CPH information is transmitted by using uplink resources allocated by the uplink grant.

3. The method of claim 1, wherein the combination indication field indicates a single combination or a plurality of combinations.

4. The method of claim 1, wherein:
   the CPH information comprises a Medium Access Control Protocol Data Unit (MAC PDU),
   the MAC PDU comprises a MAC subheader,
   the MAC subheader includes a Logical Channel ID (LCID), and
   the LCID indicates a MAC Control Element (MAC CE) including the combination indication field or a MAC CE including the CPHF.

5. The method of claim 4, wherein:
   the MAC CE comprises at least one MAC CE octet,
   a length of bits of the MAC CE octet is defined as a multiple of 8, and
   the MAC CE octet comprises the combination indication field or the CPHF.

6. A method of an eNodeB (eNB) receiving a power headroom report in a multiple component carrier system, the method comprising,
   receiving, from a User Equipment (UE), Combination Power Headroom (CPH) information which is power headroom calculated in a UE-specific way based on uplink transmission through a plurality of component carriers configured in the UE, the UE determining whether a triggering condition is satisfied before calculating the CPH, the triggering condition being satisfied when the UE enters a state in which the UE sends the CPH information;
   performing dynamic uplink scheduling for the UE based on the CPH information; and
   transmitting an uplink grant including an uplink transmission parameter determined by the dynamic uplink scheduling, to the UE,
   wherein the plurality of component carriers forms a combination, and the CPH information comprises a combination indication field indicating combination composed of the plurality of component carriers and a Combination Power Headroom Field (CPHF) indicating the CPH, and wherein the triggering condition is determined to be satisfied when a configuration of the plurality of component carriers configured in the UE is changed, when a timer for triggering the transmission of the CPH information expires, when a power headroom report for one of the plurality of component carriers configured in the UE is triggered, or when a scaling count indicating a number of times that an uplink transmission power of the UE exceeds an uplink maximum transmission power is equal to a predetermined threshold, or the triggering condition is determined to be satisfied based on a result obtained by comparing a variance of a value of a combination power coordination regarding the plurality of component carriers, configured in the UE, with a predetermined threshold.

7. The method of claim 6, wherein the combination indication field indicates a single combination or a plurality of combinations.

8. The method of claim 6, wherein:
the CPH information is composed of a Medium Access Control Protocol Data Unit (MAC PDU),
the MAC PDU includes a MAC subheader,
the MAC subheader includes a Logical Channel ID (LCID), and
the LCID indicates a MAC Control Element (MAC CE) including the combination indication field or a MAC CE including the CPHF.

9. The method of claim 8,
the MAC CE comprises at least one MAC CE octet,
a length of bits of the MAC CE octet is defined as a multiple of 8, and
the MAC CE octet comprises the combination indication field or the CPHF.

10. An apparatus for transmitting power headroom report in a multiple component carrier system, the apparatus comprising,
a combination CC generator configured to configure a plurality of component carriers configured in an UE as one combination;
a CPH calculator configured to calculate Combination Power Headroom (CPH) which is power headroom calculated in an UE-specific way based on uplink transmission through a plurality of component carriers configured in the UE;
a CPH information generator configured to generate CPH information used to inform a eNodeB (eNB) of the CPH;
a CPH information transmitter the CPH information to the eNB; and
a triggering processor configured to determine whether a triggering condition is satisfied before calculating the CPH, the triggering condition being satisfied when the UE enters a state in which the UE sends the CPH information,
wherein the CPH information comprises a combination indication field indicating combination composed of the plurality of component carriers and a Combination Power Headroom Field (CPHF) indicating the CPH, and
wherein the triggering processor determines the triggering condition is satisfied when a configuration of the plurality of component carriers configured in the UE is changed, when a timer for triggering the transmission of the CPH information expires, when a power headroom report for one of the plurality of component carriers configured in the UE is triggered, or when a scaling count indicating a number of times that an uplink transmission power of the UE exceeds an uplink maximum transmission power is equal to a predetermined threshold, or the triggering processor determines the triggering condition is satisfied based on a result obtained by comparing a variance of a value of a combination power coordination regarding the plurality of component carriers, configured in the UE, with a predetermined threshold.

11. The apparatus of claim 10, further comprising an uplink grant receiver configured to receive an uplink grant to allocate uplink scheduling for the UE from the eNB, before calculating the CPH,
wherein the CPH information is transmitted by using uplink resources allocated by the uplink grant.

12. The apparatus of claim 10, wherein the CPH information generator generates the combination indication field indicating a single combination or a plurality of combinations.

13. The apparatus of claim 10, wherein the CPH information generator generates the CPH information composed of a Medium Access Control Protocol Data Unit (MAC PDU),
the MAC PDU includes an MAC subheader,
the MAC subheader includes a Logical Channel ID (LCID), and
the LCID indicates an MAC Control Element (MAC CE) including the combination indication field or an MAC CE including the CPHF.

14. The apparatus of claim 13, wherein:
the MAC CE comprises at least one MAC CE octet,
a length of bits of the MAC CE octet is defined as a multiple of 8, and
the MAC CE octet comprises the combination indication field or the CPHF.

15. An apparatus for receiving power headroom report in a multiple component carrier system, the apparatus comprising,
a CPH information receiver configured to receive, from an User Equipment (UE), Combination Power Headroom (CPH) information which is power headroom calculated in a UE-specific way based on uplink transmission through a plurality of component carriers configured in the UE, the UE determining whether a triggering condition is satisfied before calculating the CPH, the triggering condition being satisfied when the UE enters a state in which the UE sends the CPH information;
a uplink scheduler configured to perform dynamic uplink scheduling for the UE based on the CPH information; and
a uplink grant transmitter configured to transmit an uplink grant including an uplink transmission parameter determined by the dynamic uplink scheduling, to the UE,
wherein the plurality of component carriers forms a combination, and the CPH information comprises a combination indication field indicating combination composed of the plurality of component carriers and a Combination Power Headroom Field (CPHF) indicating the CPH, and
wherein the triggering condition is determined to be satisfied when a configuration of the plurality of component carriers configured in the UE is changed, when a timer for triggering the transmission of the CPH information expires, when a power headroom report for one of the plurality of component carriers configured in the UE is triggered, or when a scaling count indicating a number of times that an uplink transmission power of the UE exceeds an uplink maximum transmission power is equal to a predetermined threshold, or the triggering condition is determined to be satisfied based on a result obtained by comparing a variance of a value of a combination power coordination regarding the plurality of component carriers, configured in the UE, with a predetermined threshold.

16. The apparatus of claim 15, wherein the combination indication field indicates a single combination or a plurality of combinations.

17. The apparatus of claim 15, wherein:
the CPH information is composed of a Medium Access Control Protocol Data Unit (MAC PDU),
the MAC PDU includes an MAC subheader,
the MAC subheader includes a Logical Channel ID (LCID), and
the LCID indicates an MAC Control Element (MAC CE) including the combination indication field or an MAC CE including the CPHF.

18. The apparatus of claim 17, wherein:
the MAC CE comprises at least one MAC CE octet,
a length of bits of the MAC CE octet is defined as a multiple of 8, and
the MAC CE octet comprises the combination indication field or the CPHF.

* * * * *